(12) United States Patent
Arhab et al.

(10) Patent No.: US 6,926,131 B1
(45) Date of Patent: Aug. 9, 2005

(54) HYDROKINETIC COUPLING APPLIANCE, IN PARTICULAR FOR MOTOR VEHICLE

(75) Inventors: Rabah Arhab, Saint-Brice-Sous-Foret (FR); Daniel Satonnet, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/806,031

(22) PCT Filed: Jul. 27, 2000

(86) PCT No.: PCT/FR00/02157

§ 371 (c)(1),
(2), (4) Date: Mar. 26, 2001

(87) PCT Pub. No.: WO01/07801

PCT Pub. Date: Feb. 1, 2001

(30) Foreign Application Priority Data

Jul. 27, 1999 (FR) .................................. 99 09740

(51) Int. Cl.[7] ............................................. F16D 37/00
(52) U.S. Cl. .................................................... 192/3.29
(58) Field of Search .............................. 192/3.29, 3.3, 192/3.28, 110 B

(56) References Cited

U.S. PATENT DOCUMENTS

| | | | | |
|---|---|---|---|---|
| 3,239,037 A | * | 3/1966 | Croswhite et al. | ............ 192/3.3 |
| 4,177,885 A | * | 12/1979 | Ross | ............ 192/3.3 |
| 4,194,604 A | * | 3/1980 | Nichols et al. | ............ 192/3.26 |
| 4,608,883 A | * | 9/1986 | Bopp | ............ 464/24 |
| 4,844,222 A | * | 7/1989 | Casse et al. | ............ 192/213.31 |
| 4,926,988 A | * | 5/1990 | Kundermann | ............ 192/212 |
| 5,161,428 A | * | 11/1992 | Petruccello | ............ 74/502.4 |
| 5,377,796 A | * | 1/1995 | Friedmann et al. | ............ 192/213 |
| 5,462,145 A | * | 10/1995 | Gimmler | ............ 192/3.29 |
| 5,795,166 A | * | 8/1998 | Meixler | ............ 439/134 |

FOREIGN PATENT DOCUMENTS

| | | |
|---|---|---|
| FR | 2748539 | 11/1997 |
| WO | 8905415 | 6/1989 |
| WO | WO-9910663 A1 * | 3/1999 |

* cited by examiner

Primary Examiner—Robert A. Siconolfi
(74) Attorney, Agent, or Firm—Liniak, Berenato & White

(57) ABSTRACT

A hydrokinetic coupling appliance, in particular for a motor vehicle, comprising a housing (30) provided with a transverse wall (3), designed to be coupled in rotation to an input shaft, a turbine wheel (12) housed inside the housing (30) and integral with a hub (14), designed to be coupled in rotation to an output shaft, a first bearing (1) integral with the transverse wall (3) of the housing (30), a locking clutch interposed between said turbine wheel (3) and the transverse wall (13). A piston (4) carries a second bearing (2) extending opposite the first bearing (1) to be linked self-disengaging to the transverse wall, and wherein friction elements (60) operate between a transverse bearing (15) of the hub (14) and the piston (4), the piston (4) being shaped to bear the friction elements (60), and the hub (14) having an axially oriented annular portion (16) facing towards the transverse wall (3) and enclosed by the piston (4) mounted axially mobile relative to the annular portion.

44 Claims, 26 Drawing Sheets

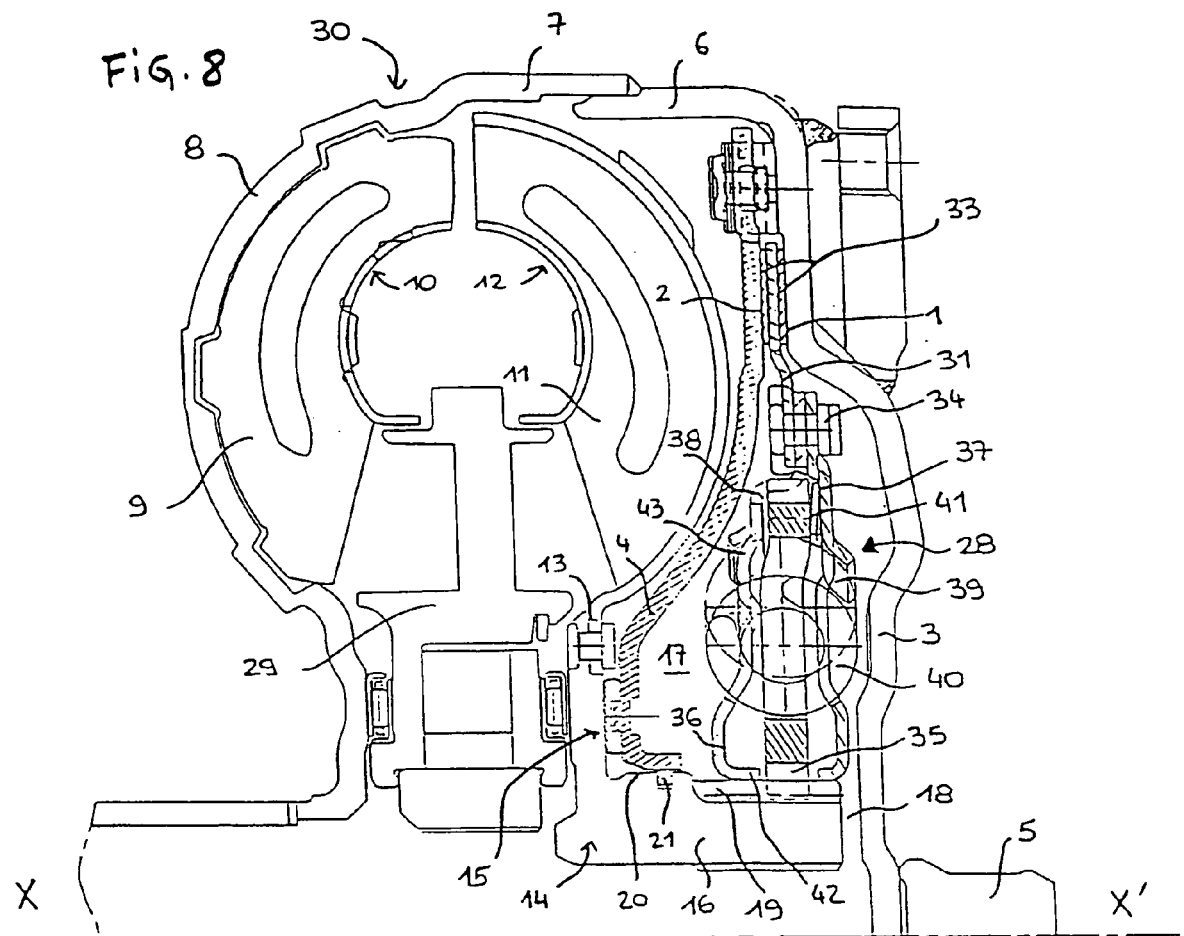
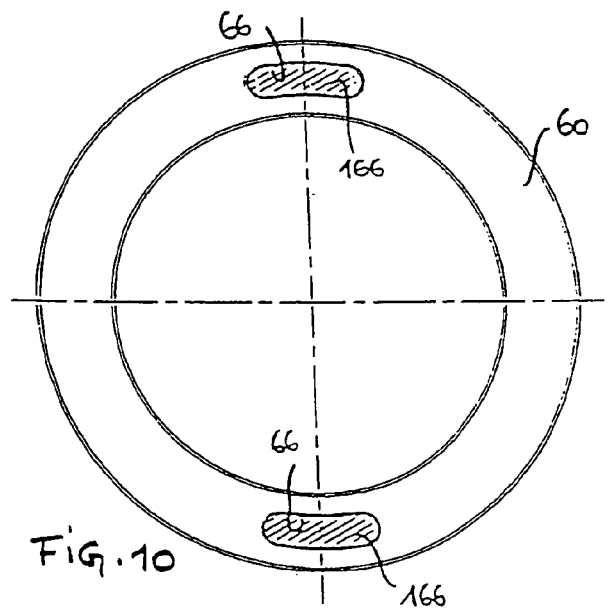
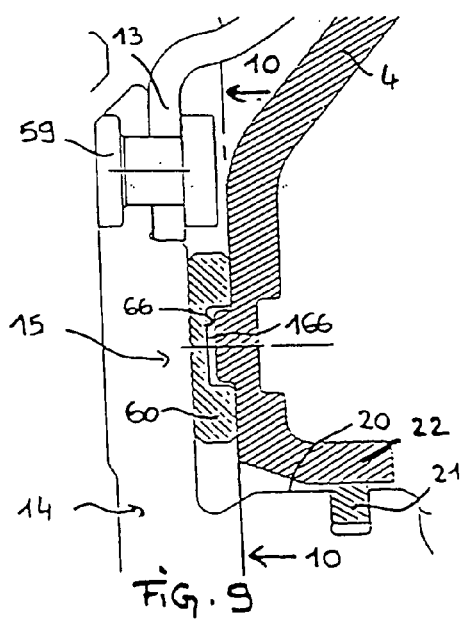

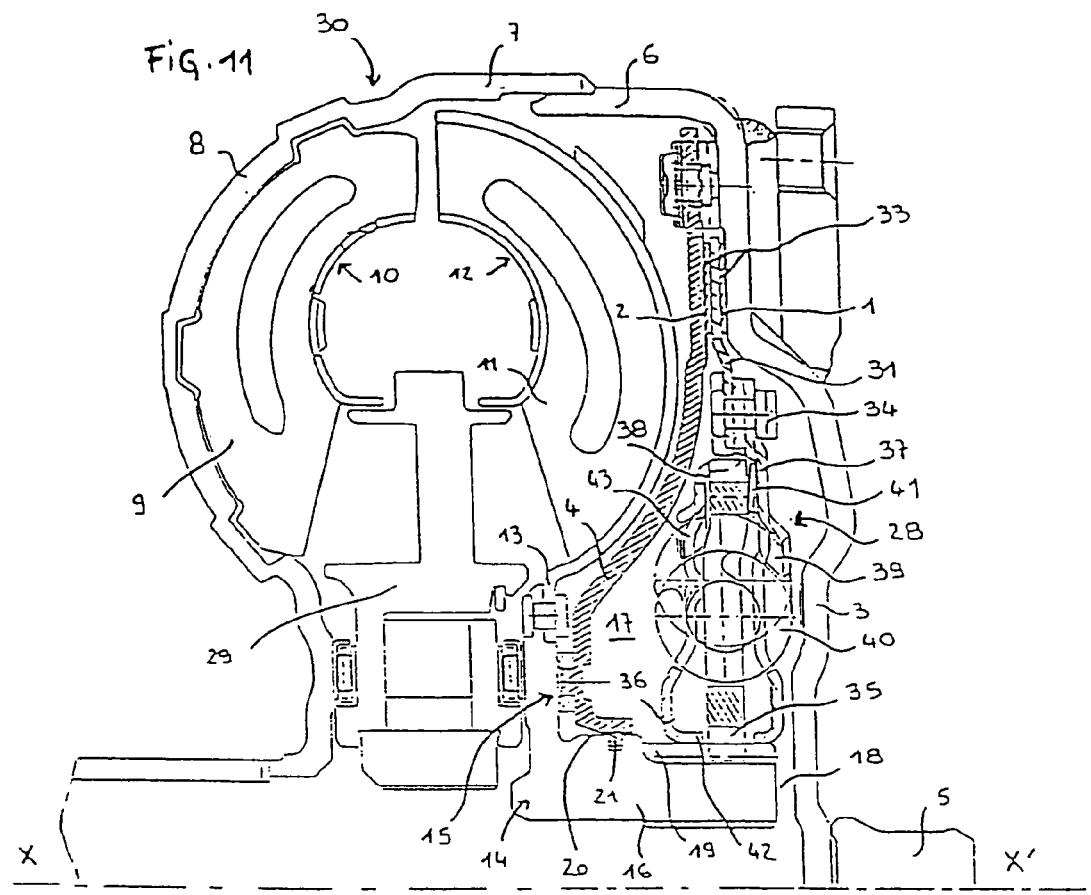
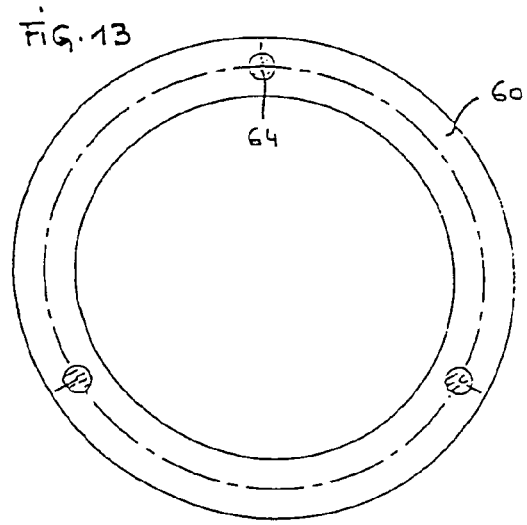
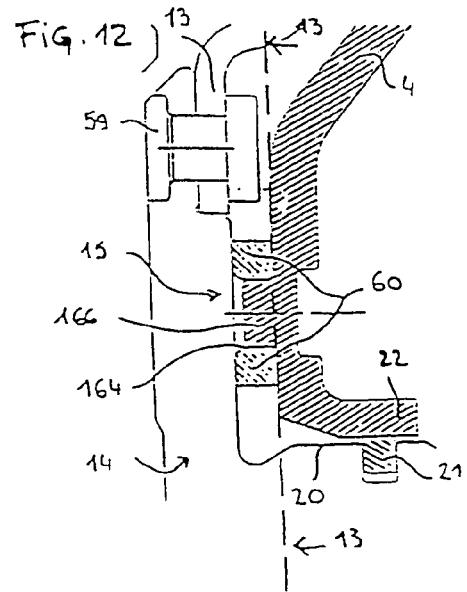

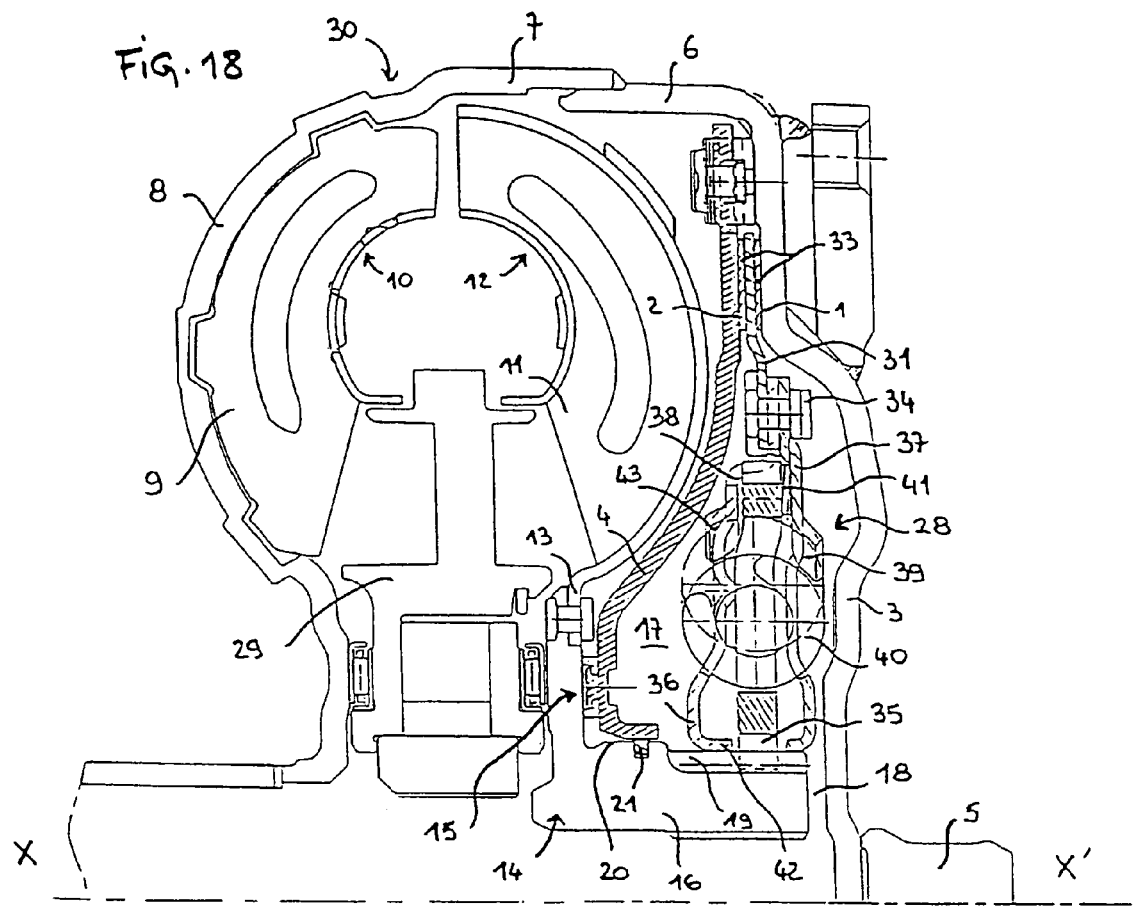
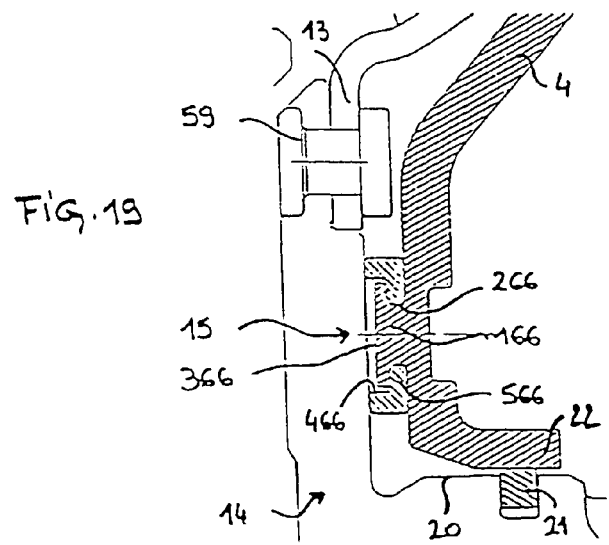

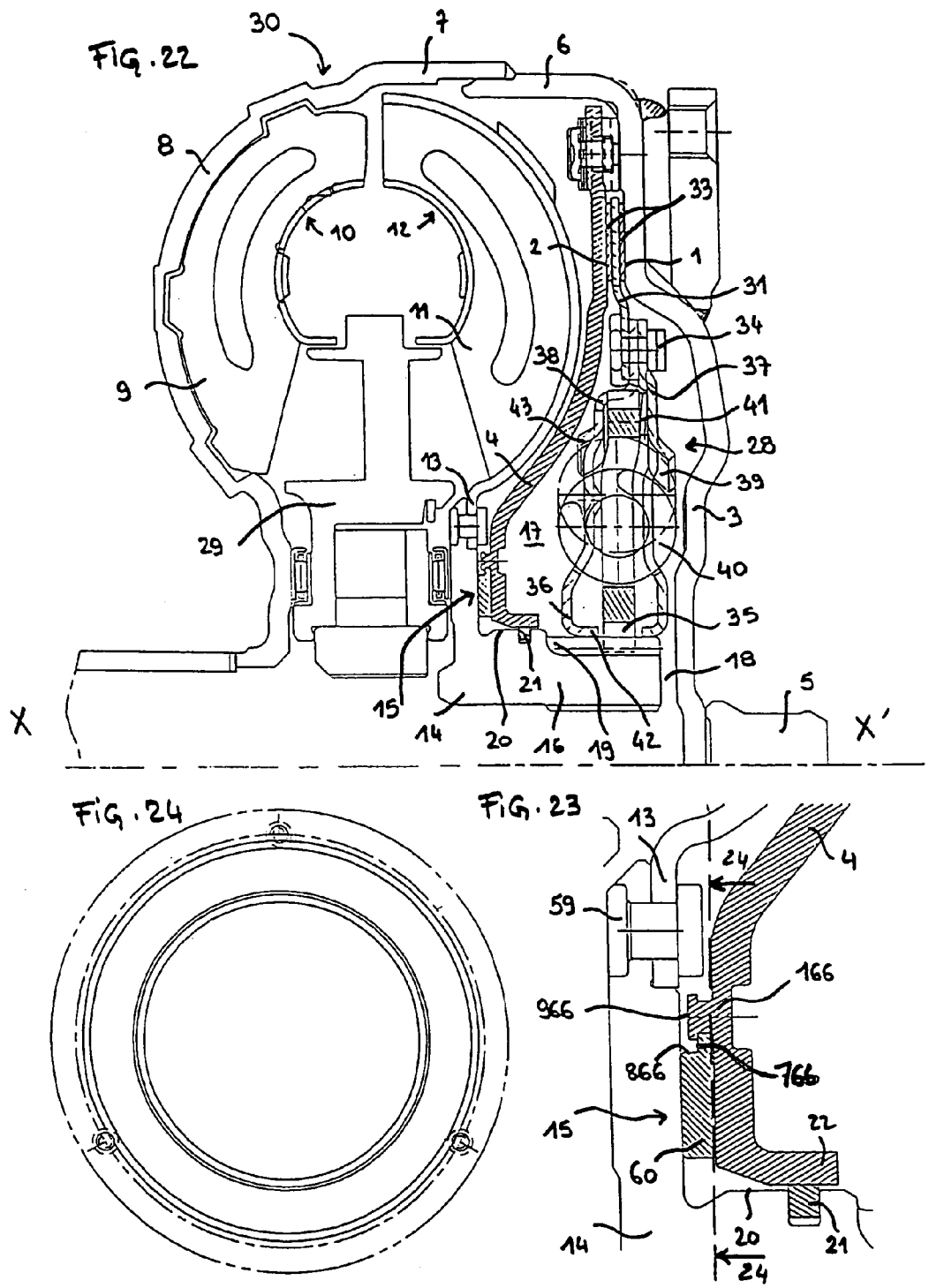

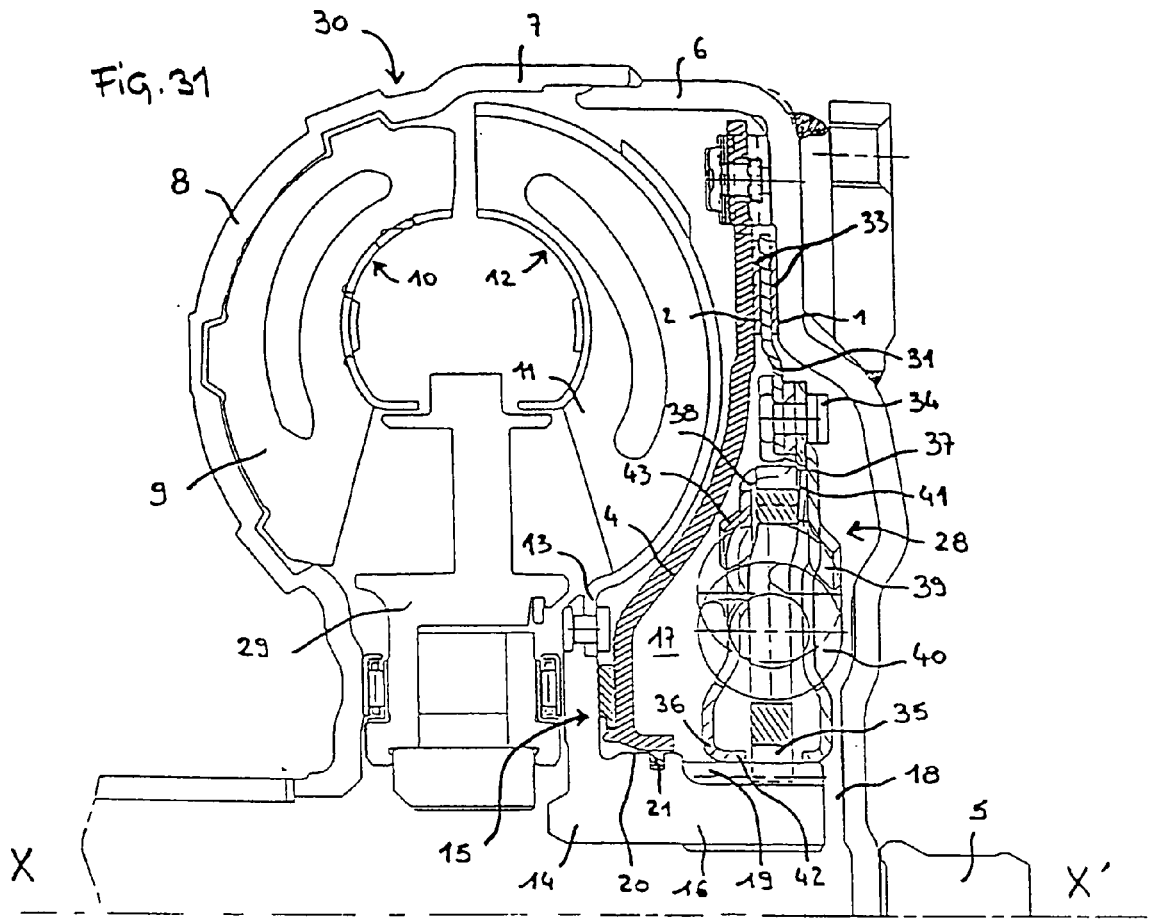
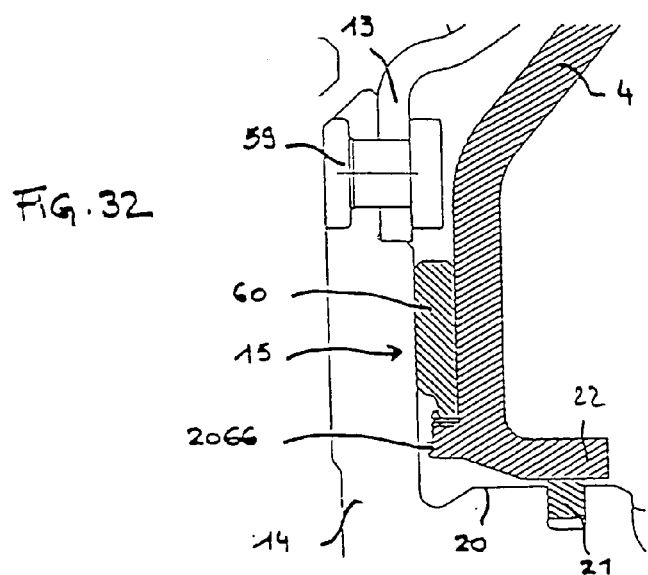

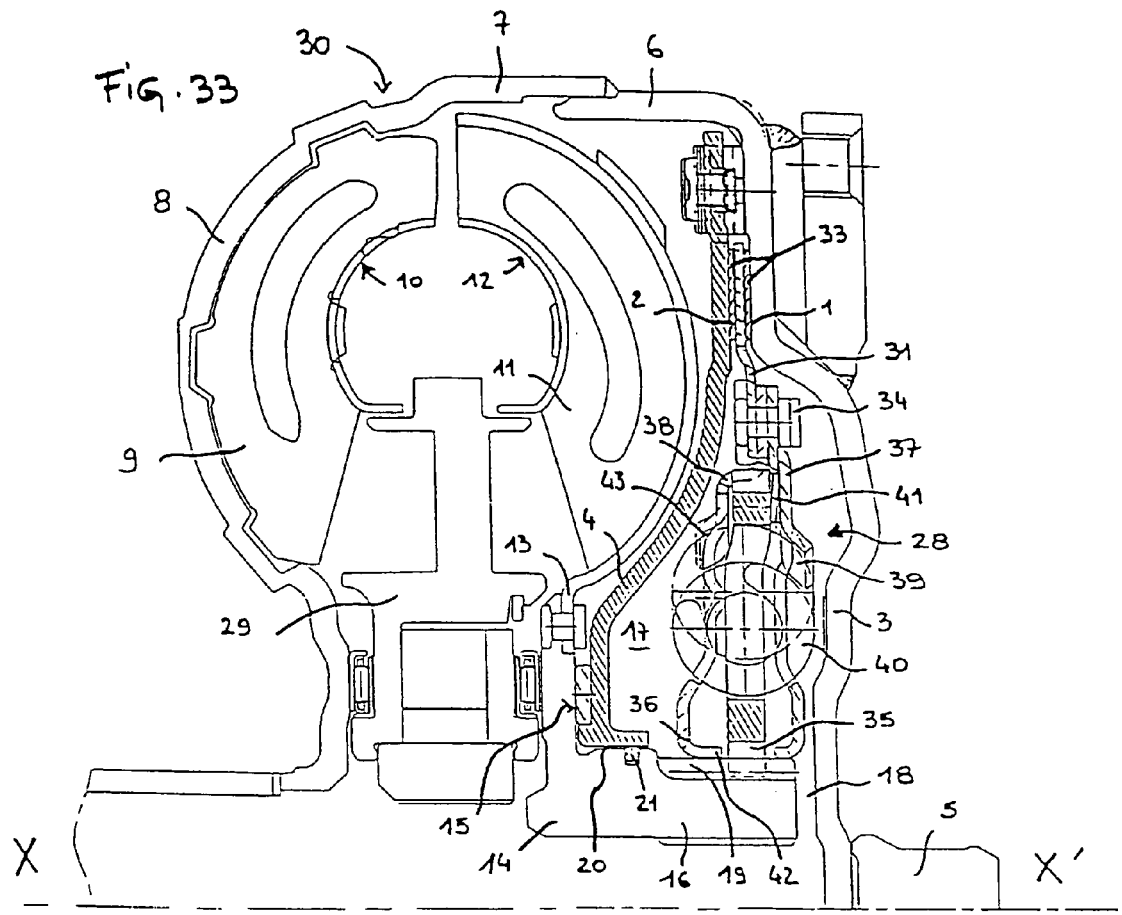
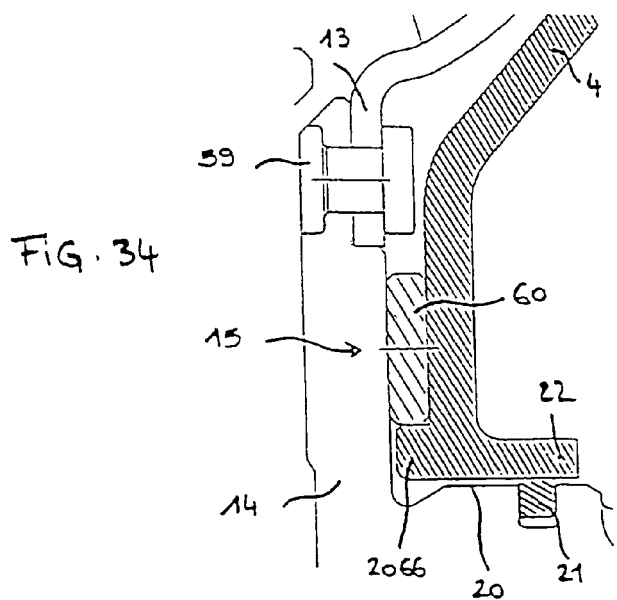

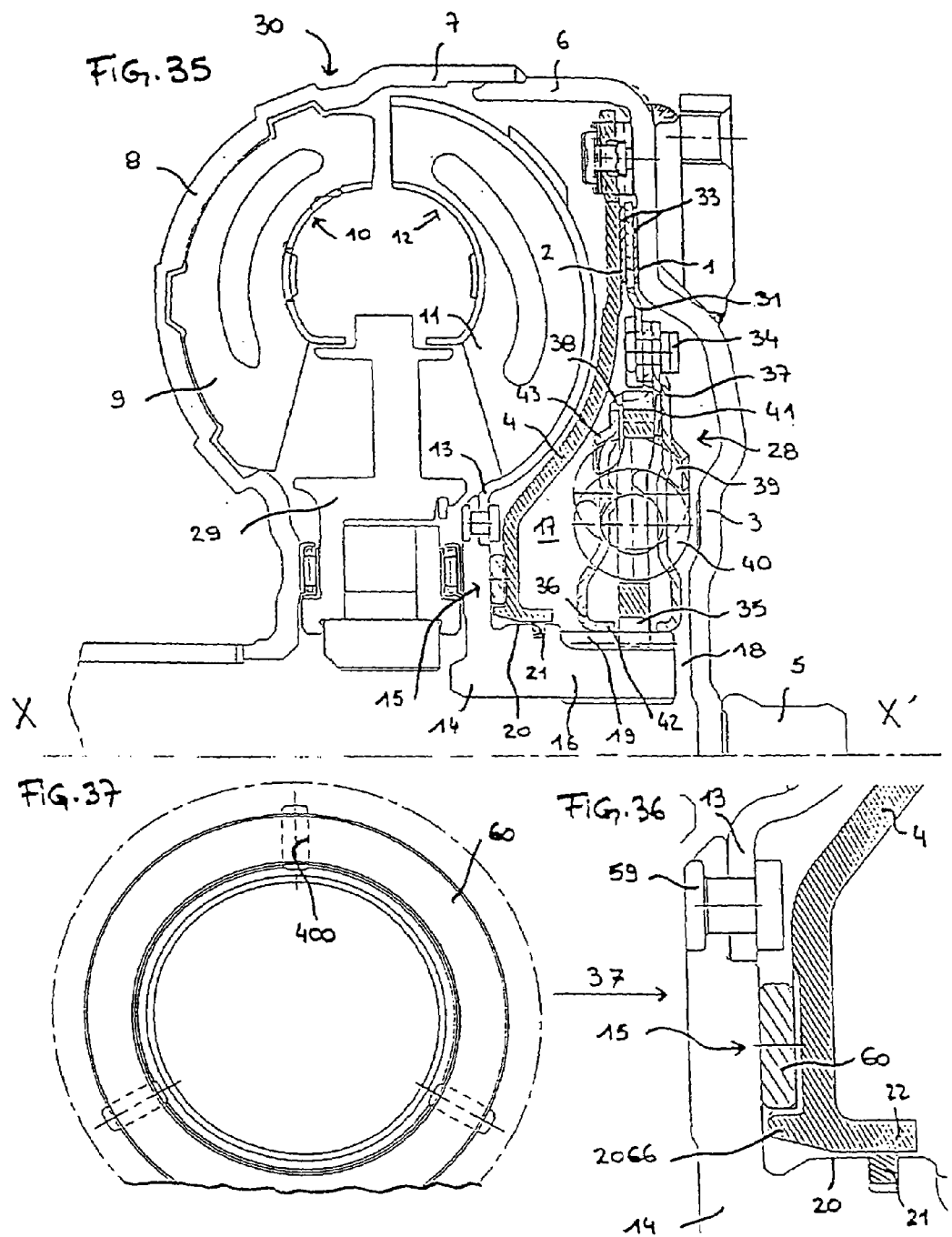

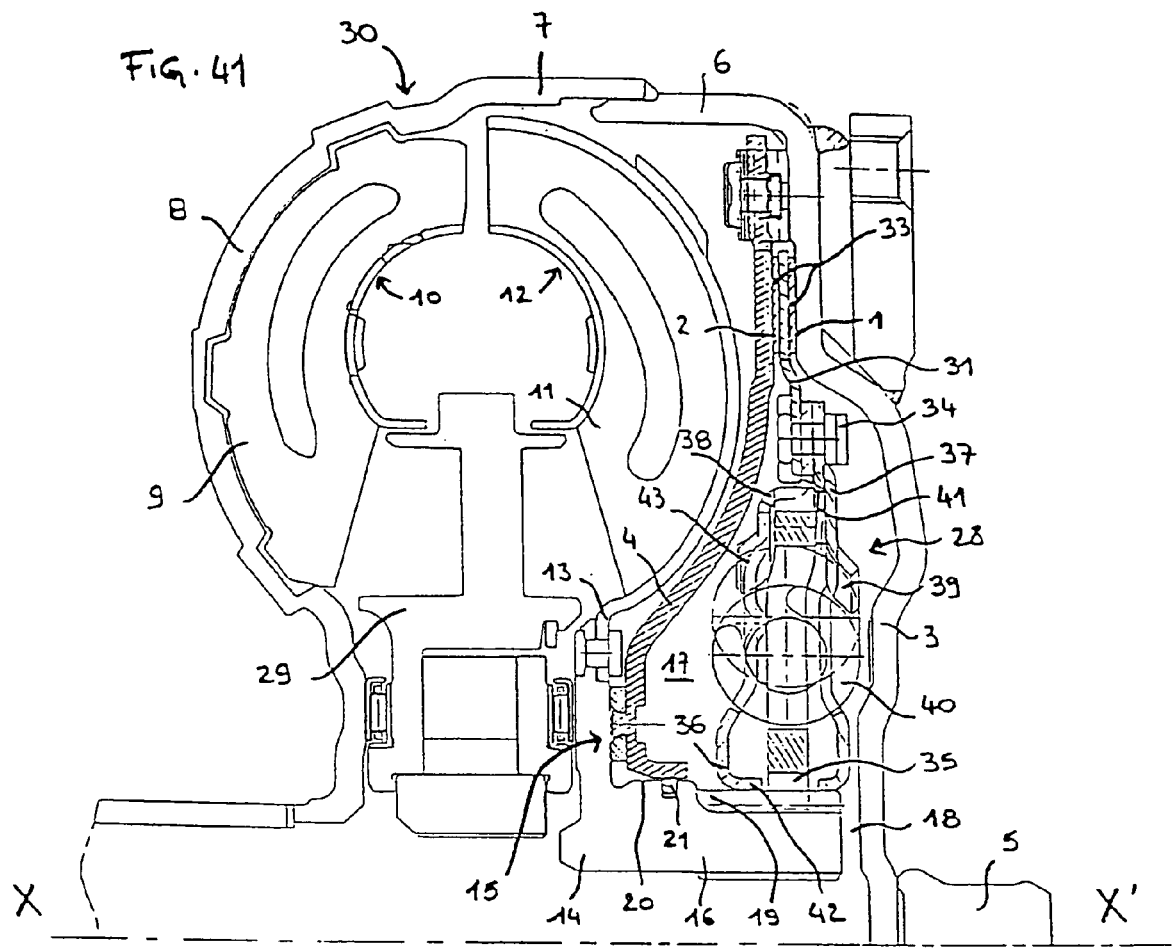
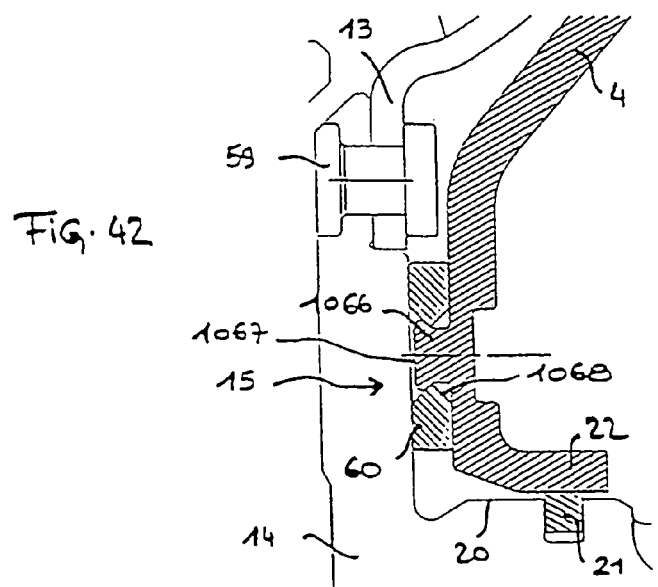

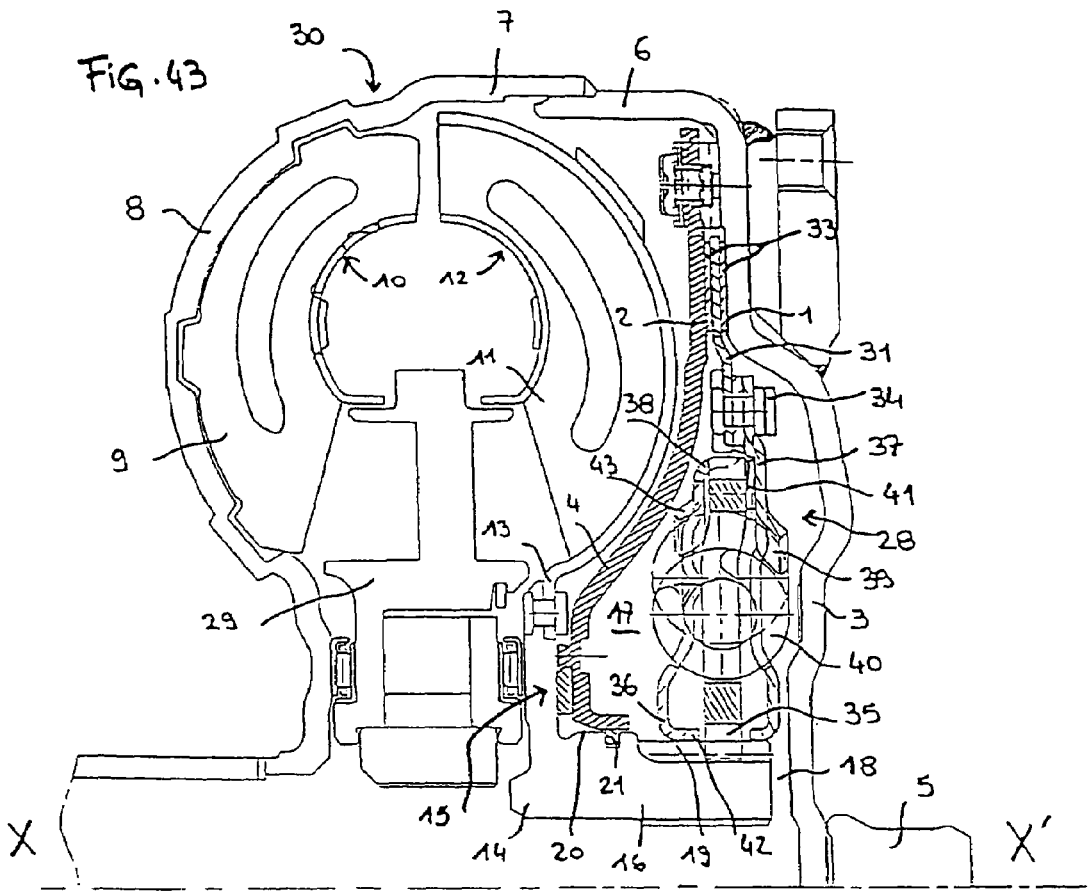
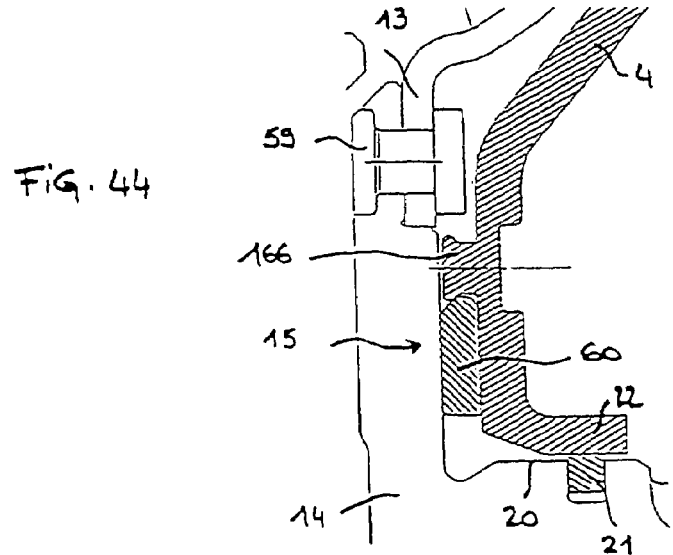

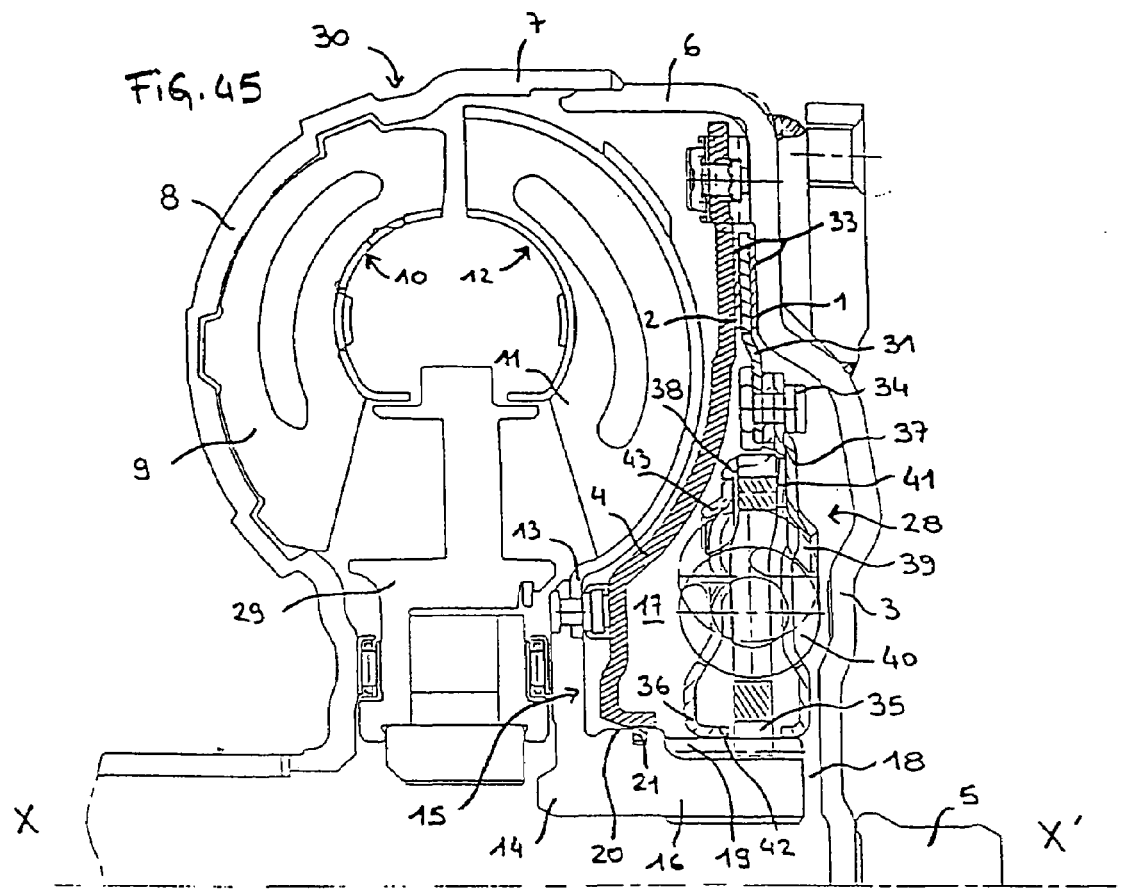
FIG. 45
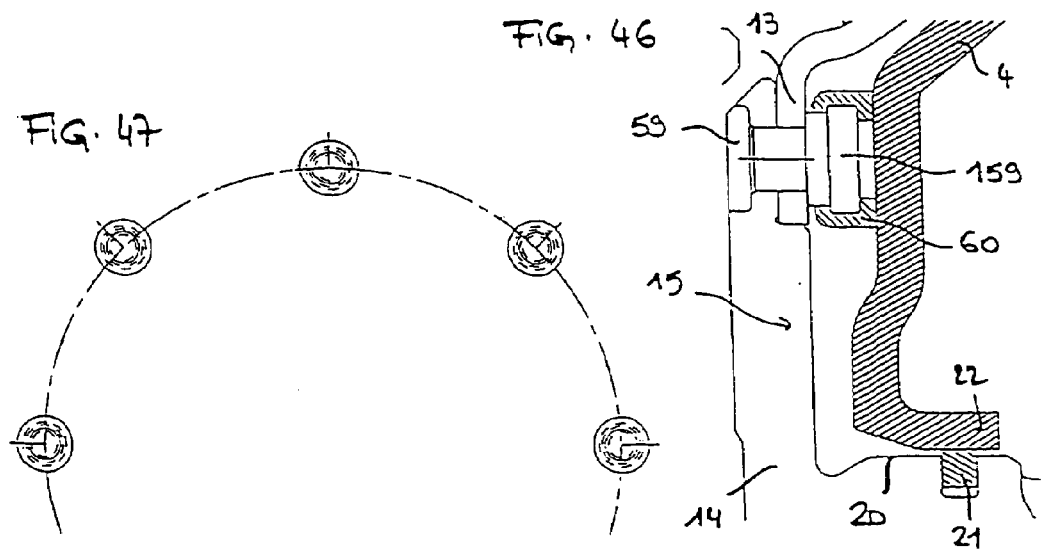
FIG. 46
FIG. 47

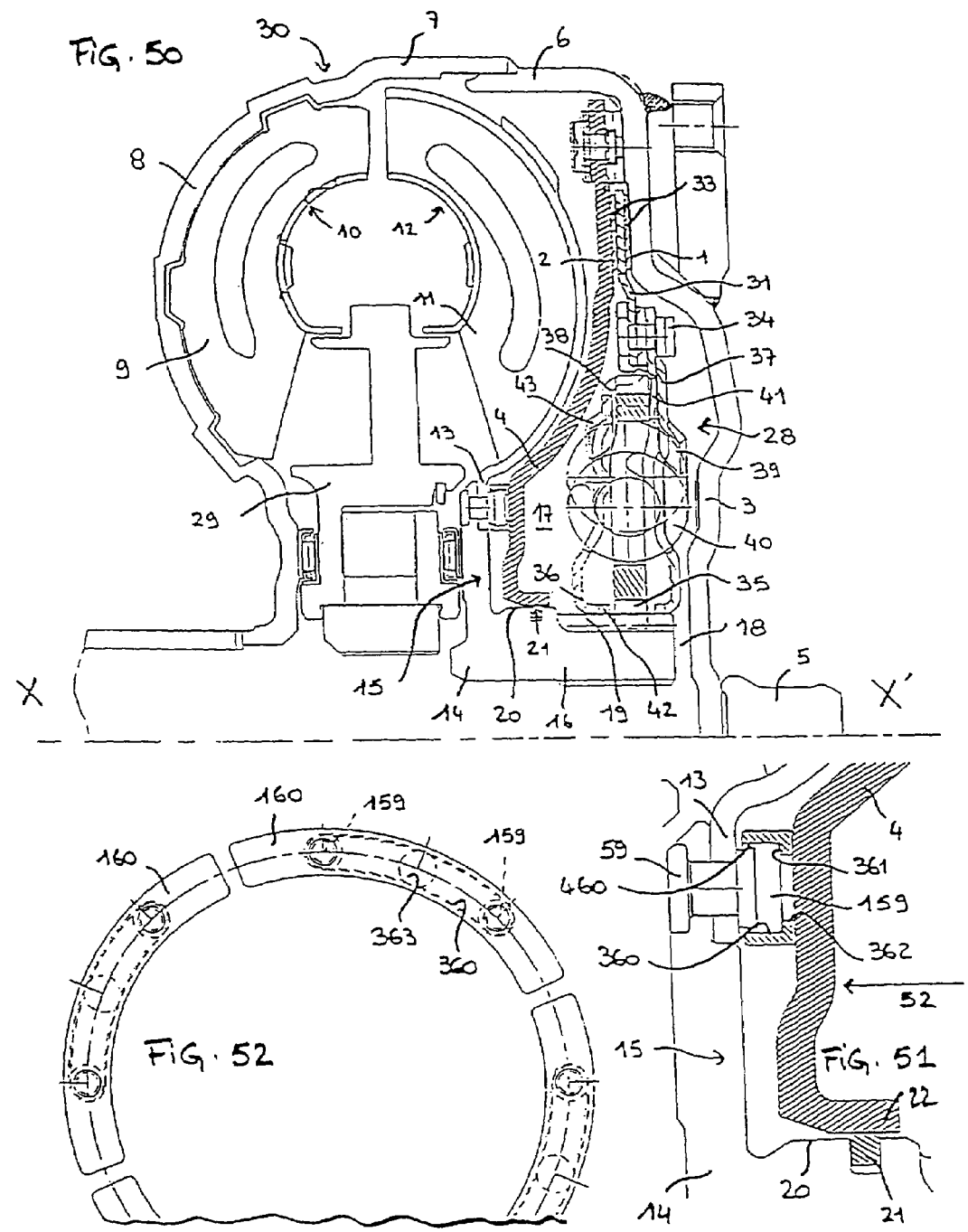

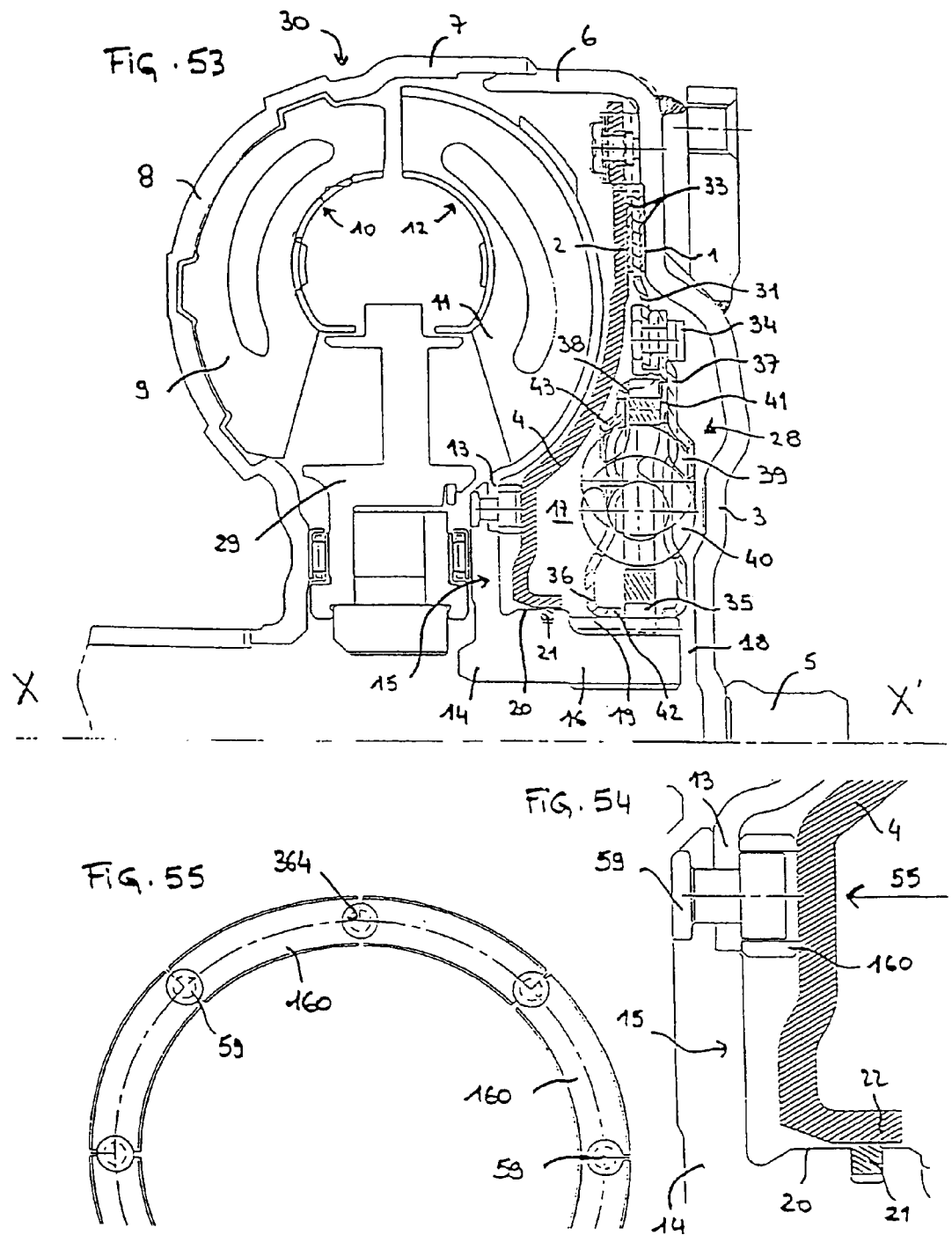

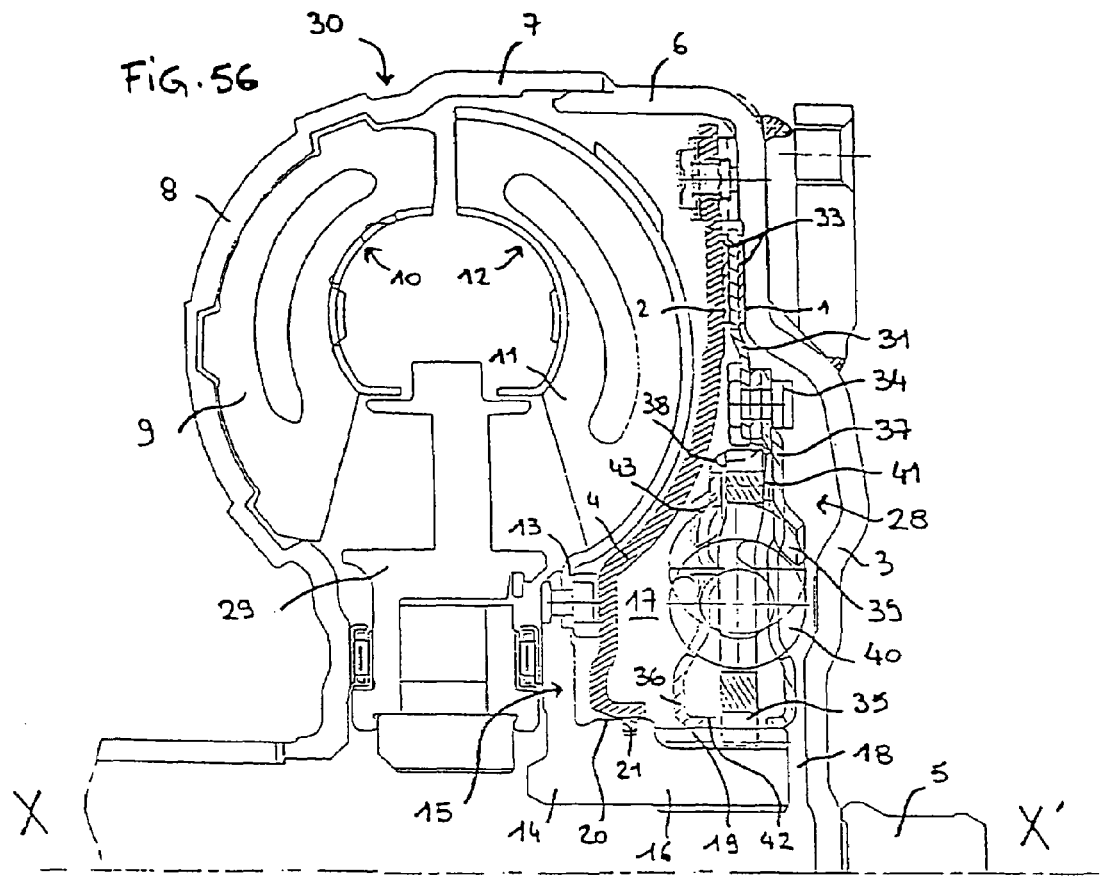
FIG. 56
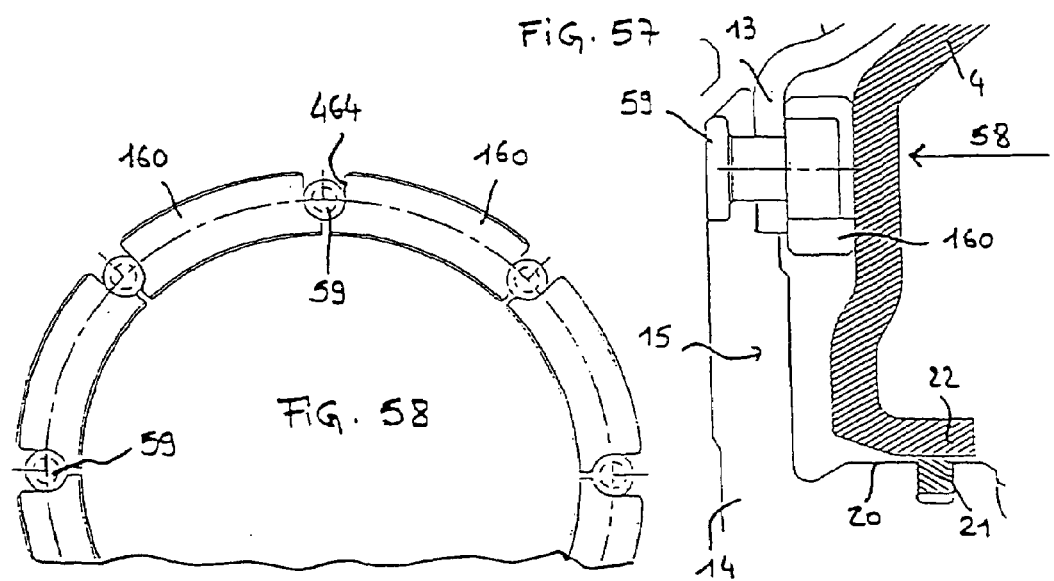
FIG. 57
FIG. 58

HYDROKINETIC COUPLING APPLIANCE, IN PARTICULAR FOR MOTOR VEHICLE

BACKGROUND OF THE INVENTION

1. Field of the Invention

The present invention relates, most particularly, to a hydrokinetic coupling apparatus for a motor vehicle.

2. Description of Related Art

Such a hydrokinetic coupling apparatus is described in the document FR96-05722 published under the No. FR-A 2 748 539. In that document, the apparatus comprises an input element, in the form of a casing having a generally transversely oriented wall, and an output element comprising a moving assembly of a turbine wheel and hub mounted inside the casing. A piston is mounted between the said moving assembly and the transverse wall. This piston is mounted for axial movement with respect to the transverse wall and is coupled in rotation to the latter.

The input element is arranged to be coupled in rotation to a driving shaft through its transverse wall, while the output element is arranged to be coupled in rotation to a driven shaft through its hub.

The piston has at its outer periphery a surface referred to as a second surface, while the transverse wall has, facing the second surface, a surface which is called the first surface. These surfaces are in this case friction surfaces, with a friction disc being interposed between the two surfaces. By varying the pressure on either side of the piston, the latter is displaced axially in one direction or the other. The piston is accordingly movable axially with respect to the hub. In order to prevent any direct contact between the piston and the hub, the said document provides for a friction means to be interposed between piston and hub.

Because of this friction means, which constitutes an end stop that limits the movement of the piston, any direct contact between the piston and the hub is avoided. The friction means enables friction between the piston and hub to be controlled.

Accordingly, it is possible according to the application to choose an appropriate coefficient of friction for the friction means, which can therefore be small so that the friction means constitutes a bearing.

However, there is a problem because the friction means is carried by the hub, which makes it necessary to carry out additional operations on this treated component so that it can slide along the driven shaft.

In order to overcome this problem it could be thought that the friction means would be attached to the guide sleeve, which is also a machined component.

SUMMARY OF THE INVENTION

An object of the present invention is to mitigate these drawbacks in a simple and inexpensive way.

According to the invention, an apparatus of the type mentioned above is characterised in that the piston is so configured as to carry the friction means.

In addition, the hub has an axially oriented annular portion which is directed towards the transverse wall and surrounded by the piston which is mounted for axial movement with respect to the said portion.

In another embodiment of the invention, a hydrokinetic coupling apparatus of the type mentioned above, which further includes a turbine wheel having an annular ring which may be of divided form, and which is fixed to the hub by means of at least one rivet, and a friction means acting between the hub and the piston, is characterised in that the friction means is carried by at least one rivet.

In one embodiment, the friction means or the piston has at least one projecting element engaged in a complementary hole of the other one of the elements consisting of the piston and friction means.

Preferably, the projecting element is part of the piston and has a closed base. The projecting element extends in a first embodiment towards the transverse wall, and in a second embodiment towards the piston. This projecting element is easily made by press-forming in the piston, and, on the one hand, it preserves the seal of the piston, while on the other hand it enables the friction means to be fitted, especially by telescoping, snap-fitting, riveting, in situ moulding, swaging, screwing, seaming or, again, by a bayonet fitting.

Preferably, a passage is established for the fluid between the inner and outer peripheries of the friction means, and this passage may be obtained either by recessing the piston, or by giving the friction means grooves, or again by recessing the turbine hub in order to renew the oil film between the friction means and the transverse surface of the hub, thereby reducing wear in the friction means while preventing any danger of sticking.

In one embodiment, the friction means is mounted with respect to the piston with a clearance so as to give good contact with the transverse surface.

In another embodiment, the piston is mounted with respect to the hub with a radial clearance, and with a sealing ring interposed. In this embodiment, axially resilient tongues for allowing the piston to be displaced axially couple the piston in rotation to the outer periphery of the casing of the hydrokinetic coupling apparatus.

Thanks to this arrangement, the friction means has some capacity for movement so that its surface of contact with the transverse surface of the hub is maximised. In another version, the piston may be mounted for axial sliding movement along the hub, and radial and axial resilient means are interposed between the piston and the friction means in order to allow displacement of the friction means, so as to maximise the contact surface area between the friction means and the transverse surface. The resilient means may be part of either the friction means or the piston.

All these arrangements tend to lead to an increase in the useful life of the friction means and also the reliability of the whole.

The invention enables the guide sleeve to be omitted and the friction means to be attached to the piston, the latter being preferably of metal.

Thus it is no longer necessary to machine the hub in order to form housings for projecting elements carrying the friction ring, and as a result the elements of the hydrokinetic coupling apparatus are simplified, and costs are reduced without any adverse effect on performance.

BRIEF DESCRIPTION OF THE DRAWINGS

It will be well understood from the following description that the features of the present invention may be applied in all types of hydrokinetic coupling apparatus, especially in apparatuses equipped with a bridging clutch of the monoface or biface type, that is to say a clutch having at least two friction surfaces.

The following description illustrates the invention with reference to the attached drawings, in which:

FIGS. 6, 8, 11, 14, 16, 18, 20, 22, 25, 27, 29, 31, 33, 35, 38, 41, 43, 45, 48, 50, 53 and 56 are views similar to FIG. 1 for other embodiments of the invention, FIGS. 9, 12, 15, 17, 19, 21, 23, 26, 28, 30, 32, 34, 36, 39, 42, 44, 46, 49, 51, 54 and 57 are views similar to FIG. 4, for the various embodiments shown respectively in FIGS. 8, 11, 14, 16, 18, 20, 22, 25, 27, 29, 31, 33, 35, 38, 41, 43, 45, 48, 50, 53 and 56, FIG. 10 is a view in cross section taken on the line 10—10 in FIG. 9, FIG. 13 is a view in cross section taken on the line 13—13 in FIG. 12, FIG. 24 is a view in cross section taken on the line 24—24 in FIG. 23, FIG. 37 is a scrap view in the direction of the arrow 37 in FIG. 36, without the hub, FIG. 47 is a view showing the distribution of the rivets having friction means, FIG. 52 is a scrap view in the direction of the arrow 52 in FIG. 51, without either the piston or the hub, FIG. 55 is a scrap view in the direction of the arrow 55 in FIG. 54, without either the piston or the hub, FIG. 58 is a scrap view in the direction of the arrow 58 in FIG. 57, without either the piston or the hub.

DETAILED DESCRIPTION OF THE PREFERRED EMBODIMENTS

Figure 1:
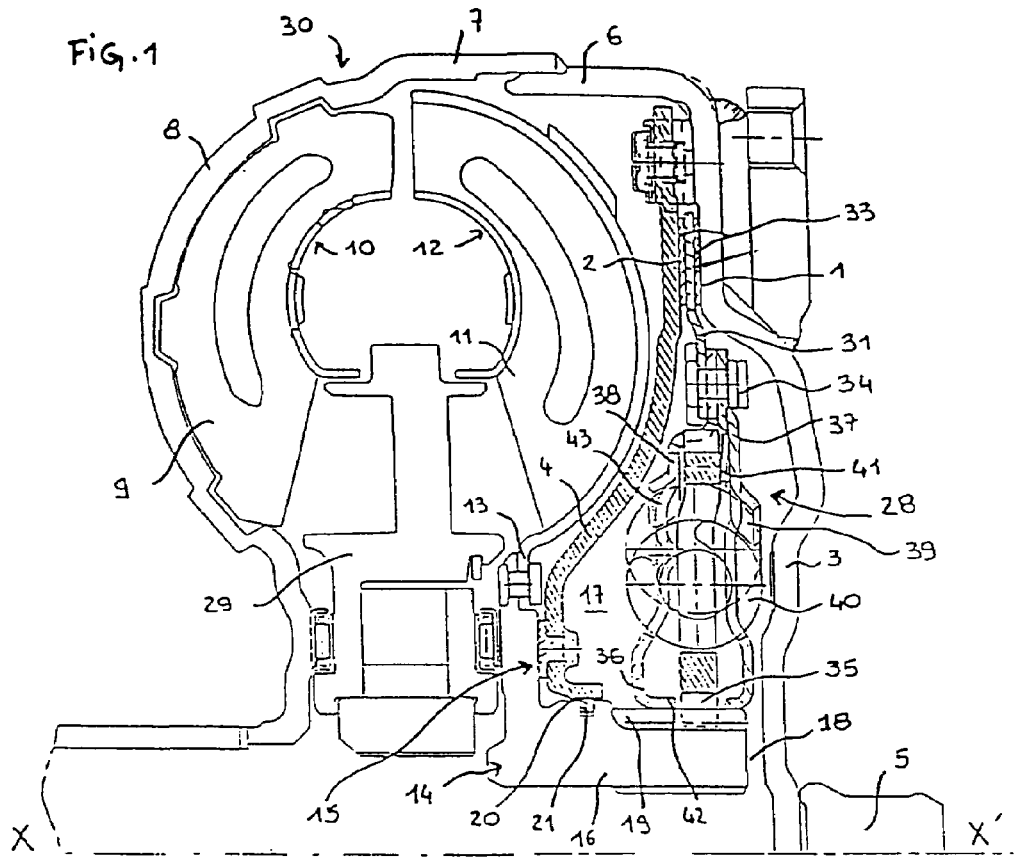
FIG. 1 is a half view in axial cross section of a fluid coupling apparatus according to the invention.

In the drawings, those elements which are common will for simplicity be given the same reference signs.

Thus, in FIGS. 1 to 4 a first surface and a second surface are shown at 1 and 2 respectively. These surfaces 1 and 2 are oriented transversely and are formed at the outer periphery of a generally transversely oriented wall 3 and a piston 4 respectively.

The surfaces 1, 2 in this example are integral with the wall 3 and piston 4. In another version, at least one of the surfaces 1, 2 may be part of an additional member which is secured, for example by welding, on the wall 3 or piston 4 as the case may be.

The piston 4 is mounted while being axially displaceable with respect to the wall 3, which has a central, generally tubular, axially projecting centring nose 5.

The wall 3 is extended at its outer periphery by an axially oriented annular first flange 6, to define a first casing element 3, 6. An axially oriented annular second flange 7 is centred in the region of its free edge on the free end of the first flange 6. This second flange 7 is therefore in intimate contact through its inner periphery with the outer periphery of the first flange 6, and in this example it is welded on the first flange 6. The second flange 7 is extended by a semi-toroidal envelope 8, on the inside of which the vanes 9 of an impulse wheel 10, which are in facing relationship with the vanes 11 of a turbine wheel 12, are fixed. The flange 7 and envelope 8 are part of a second casing element 7, 8. The piston 4 lies between the turbine wheel and the wall 3.

The turbine wheel 12 has an internal annular ring portion 13, which may be of divided form and by which it is fixed, in this example by rivets 59 but, in another version, by welding, on the outer periphery of a hub 14, which is generally L-shaped and is directed axially towards the wall 3. It is therefore on the transverse portion 15 of the hub 14, this portion being in the form of a radial plate, that the ring 13 is fixed, while the axial portion 16 of the hub 14 is splined internally for coupling the hub 14, and therefore the turbine wheel 12, with a driven shaft not shown. This driven shaft is, in the known way, formed with a central duct for feeding a hydraulic control chamber 17 delimited axially by the piston 4 and wall 3, and radially, internally, by the axial portion 16 of the hub 14. For this purpose, at least one passage 18 is formed between the free end of the axial portion 16 and the wall 3 for passage of the control fluid, which is oil in this example and which comes from the duct in the driven shaft. The portion 16 is generally tubular, and has external splines 19 in the vicinity of its free end. The axial portion 16 has, between the plate 15 and splines 19, an external smooth surface 20, the diameter of which is slightly greater than that of the splines 19, so that the axial portion 16 is of stepped diameter. A sealing ring 21 is fitted in a groove (which has no reference numeral) formed in the surface 20.

This seal 21 co-operates with an axially oriented flange 22 formed on the piston 4 at its inner periphery.

A seal is thereby created at this level, and according to one feature the surface 20 is not a guide surface, so that this surface has no need to be machined, which reduces the cost of the hub 14.

In this connection, there is a radial clearance between the surface 20 and the flange 22. The piston 4 is coupled in rotation, with axial displacement being possible, to one of the flanges 6, 7 by means of a coupling with axially elastic tongues 23.

The number of tongues 23 depends on the application, these latter being spaced apart circumferentially at regular intervals in several sets of tongues 23, and in this example each set consists of at least one tongue. In this embodiment there are three sets of tongues 23.

The tongues 23 may be oriented transversely, being for example of triangular or rectangular form, or even tangential. The tongues 23 are interposed between a first member 24 fixed to the piston 4 and a second member 25 fixed to one of the flanges 6, 7.

Figure 6:
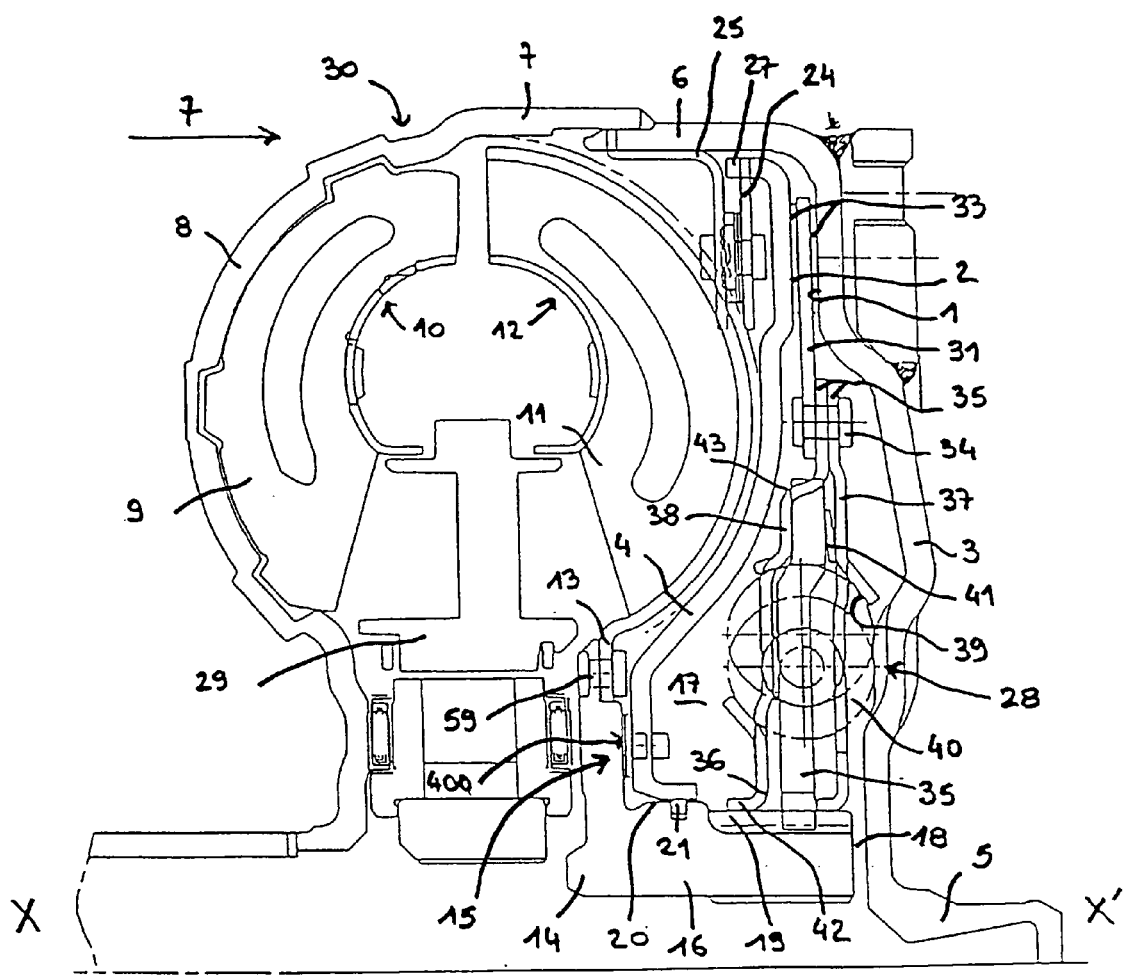
Figure 7:
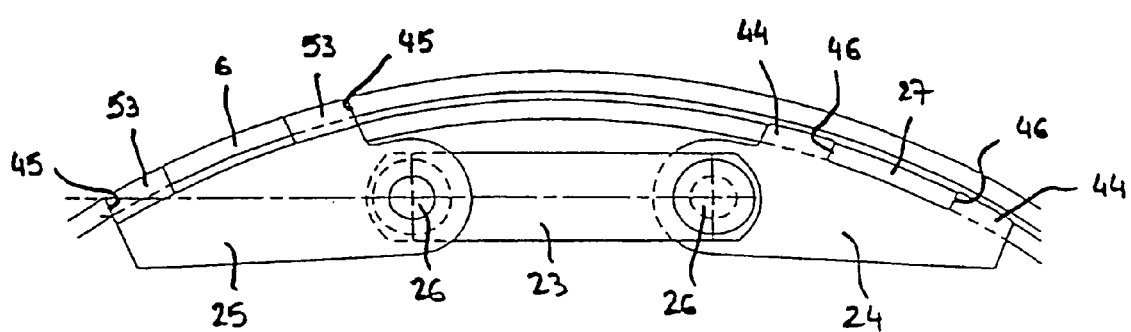
FIG. 7 is a scrap view in the direction of the arrow 7 in FIG. 6, without the torque converter.

In the embodiment shown in FIG. 1, the tongues 23 are fixed at each of their ends by means of rivets 26 on the first member 24 and the second piece 25 respectively, as can be seen in particular in FIG. 7. In this version, the first member 24 is integral with the piston 4 and consists of a plurality of lugs which project radially outwards from the outer periphery of the piston 4. In FIGS. 6 and 7 the member 24 is a separate piece from the piston 4. To this end, the piston 4 has at its outer periphery an axially oriented annular first skirt 27 which extends axially away from the flange 22, that is to say towards the turbine wheel 12.

The skirt 27 stiffens the piston 4. In all cases the piston 4, radially inwardly of its surface 2, matches the form of the turbine wheel 12 and hub 14, so as to reduce the overall size of the hydrokinetic coupling apparatus, which comprises the turbine wheel 12, impulse wheel 10, piston 4, hub 14, and a torsion damper 28 which will be described below. The apparatus has an axial axis of symmetry and rotation X–X'.

In this example, the apparatus also includes a reaction wheel 29 so that it constitutes a torque converter in the known way.

The casing elements 7, 8, and 3, 6 constitute a sealed casing 30 which is filled with oil; inside which are the components 29, 10, 12, 4, 14 and the damper 28 which, in this case, is of the standard type. More precisely, the damper 28 comprises an input element 31 in the form of a disc arranged to be gripped between the surfaces 1, 2. This element 31 is coupled elastically to a central damper plate 35, which is splined internally for mounting on the external splines 19 of the hub 14. The damper plate 35 in this case meshes without any circumferential clearance with the hub 14; the splines 19 of the hub 14 and the internal splines 32 of the damper plate 35 are of complementary forms.

As will have been understood, and in a known way, by varying the pressure on either side of the piston 4—for example by varying the pressure in the hydraulic control chamber 17 using the supply duct in the driven shaft and the passage 18—the piston 4 is displaced towards the wall 3 or away from the wall 3 so that, in one case, it grips the disc 31 between the surfaces 1, 2, or releases the disc 31.

When the disc 31 is gripped, the lock-up clutch, which comprises the surfaces 1, 2 and the torsion damper 28, is said to be engaged or bridged, in such a way that the rotary driving motion is transmitted directly from the driving shaft—the crankshaft of a motor vehicle in the case of application to a motor vehicle—to the driven shaft through the lock-up clutch without any relative sliding between the turbine wheel 12 and impulse wheel 10, and this reduces the fuel consumption of the vehicle.

When the disc 31 is released, the lock-up clutch is said to be disengaged or unbridged, so that the rotary driving motion is transmitted from the driving shaft to the driven shaft through the torque converter by virtue of the flow of oil between the vanes 9, 11 of the impulse wheel 10 and turbine wheel 12. This is what happens when the motor vehicle is started.

The tongues 23 enable the piston 4 to move axially with respect to the wall 3 during the change of the lock-up clutch 1, 2, 28 from one position to the other.

In this case, the disc 31 carries friction liners 33 fixed on each of its faces. In another version, the liners 33 are fixed to the surfaces 1, 2, 7 which are accordingly fastening surfaces. In another version, the disc 31 is embedded at its outer periphery in a friction liner. In a further version, the disc 31 is in direct frictional contact against the surfaces.

Preferably, the liner or liners 33 are provided with grooves extending from their inner periphery to their outer periphery so as to provide a good cooling effect, the grooves being in contact with the surfaces 1, 2 or with the disc 31.

In FIGS. 1 to 5, the tongues 23 are radially inside the liners 33 and surface 2. In FIGS. 6 and 7, they lie facing the surface 2 and liners 33.

In this case, the disc 31 is fixed at its inner periphery by means of rivets 34 to external peripheral annular ring portions 55, 155 which are part of guide rings 36, 37 disposed on either side of the damper plate 35.

The ring portions 55, 155 are in contact with each other. The damper plate 35 and the guide rings 36, 37 are provided with windows 38, 39, facing each other for holding resilient members 40 which in this example consist of coil springs or concentric helical springs. An axially acting spring 40 bears on the guide ring 37 which is proximal to the wall 3, for action on the damper plate 35 and for gripping the latter in contact with the other guide ring 36 which is proximal to the piston 4.

Figure 2:
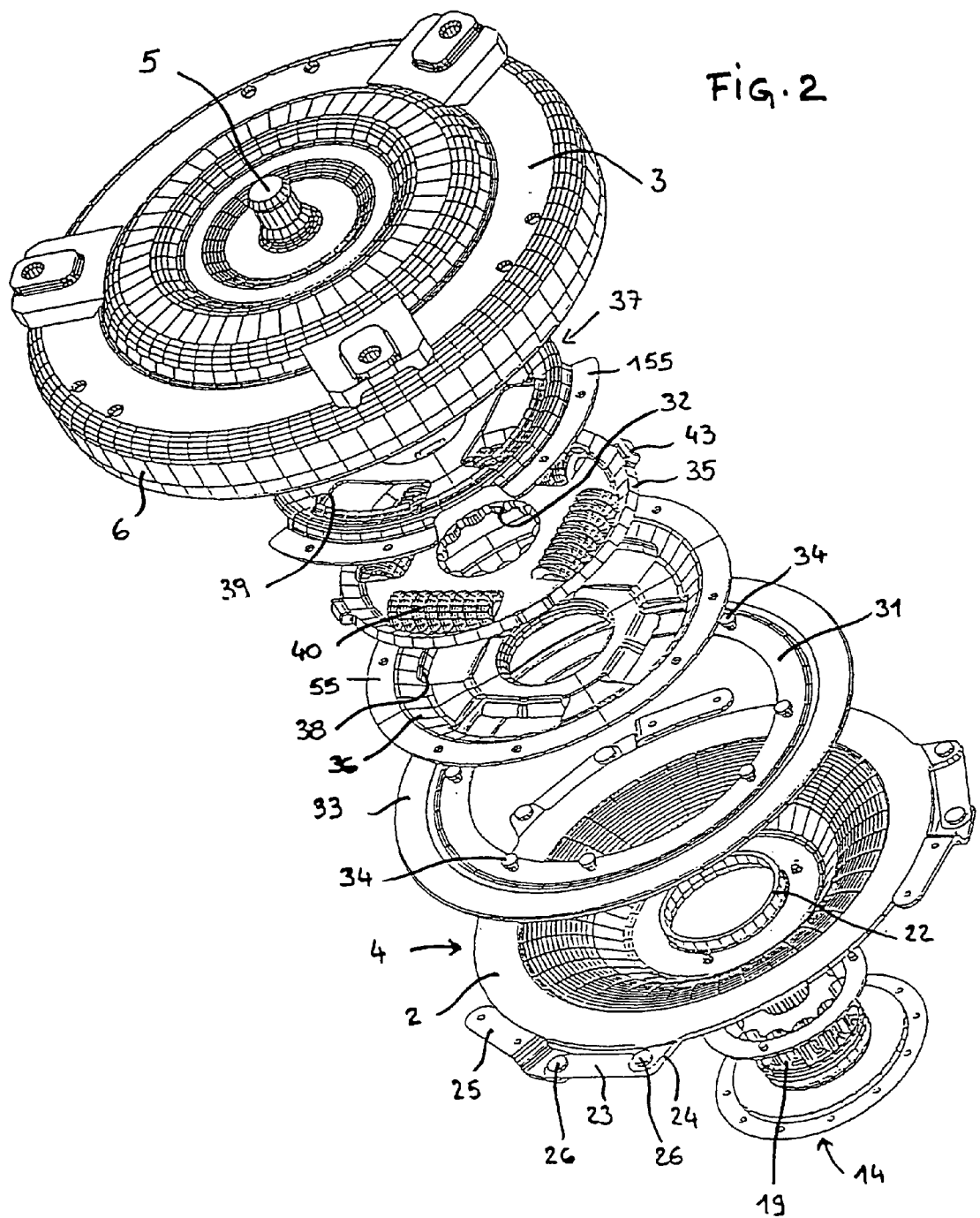
FIGS. 2 and 3 are exploded views of the hub, the lock-up clutch, the casing element and the torsion damper of the hydrokinetic coupling apparatus.
Figure 3:
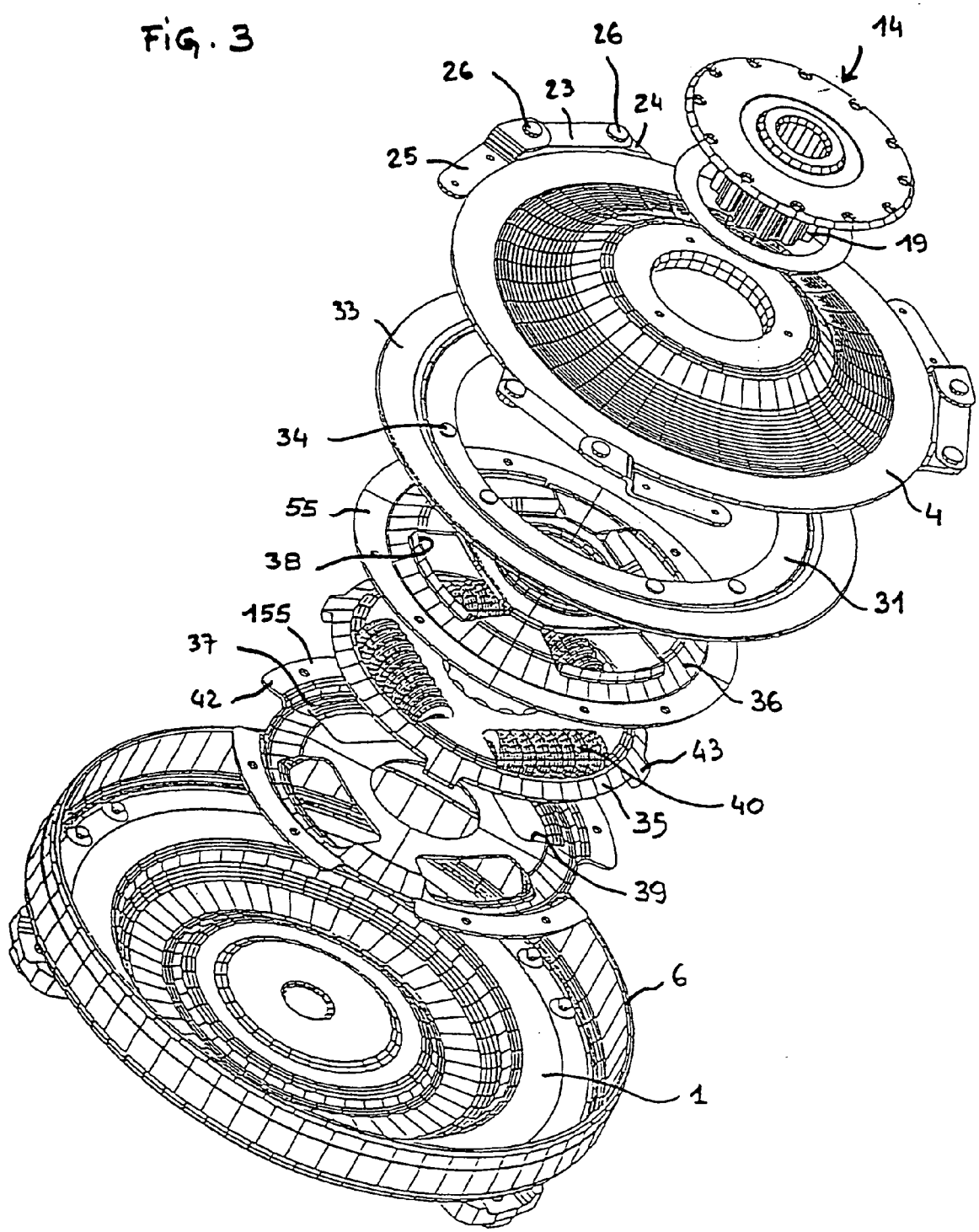

For this purpose, the ring 36 has a serpentine form with a surface radially outside the springs 40. The damper plate 35 has at its outer periphery radial lugs 43, each of which penetrates, with a circumferential clearance, into a notch 42 which, in FIGS. 2 and 3, is formed in the outer periphery of the guide ring 37, so that the latter has a discontinuous ring portion 155. The lugs 43, by co-operating with the appropriate side edges of the notches 42, limit the relative angular displacement between the damper plate 35 and the guide rings 36, 37.

In FIGS. 1 and 6 the structures are reversed, with the notches being formed in the guide ring 36.

During the said displacement, the damper plate 35 rubs frictionally on the ring 41, which in this example is a Belleville ring but which in another version is a corrugated ring.

The damper 28 is therefore preferably in the form of a conventional friction clutch, the guide rings 36, 37 of which have, in this case at their inner periphery, collar portions, which project axially towards the plate 15 in FIG. 6 and towards each other in FIG. 1. In FIGS. 2 and 3, only the guide ring 36 has a collar portion, and all combinations are possible. Each collar portion is substantially in contact with the outer periphery of the splines 19, and its function is stiffening of the whole.

The second connecting member 25 for the tongues 23 has, in FIGS. 1 to 3, the form of a stepped tongue with an ear for fastening one end of the tongue 23 by means of the rivets 26. This ear is joined through a rounded portion to a strip having two holes for fastening the member 25 by riveting to the outer periphery of the wall 3. Threaded plates (not given a reference numeral) are secured on the outer face of the wall 3, in this example by welding.

In the known way, a radial plate 15 is screwed on these plates so as to couple the first casing element 3, 6 in rotation to the driving shaft.

The connecting members 25 extend tangentially with respect to the outer periphery of the piston, and are riveted to the outer periphery of the wall 3, so that the friction liners 33 have a large-outer diameter, which is favourable to torque transmission. It is of course possible to increase the outer diameter of the liners 33 even more, so as to transmit even more torque, as can be seen in FIG. 6.

Thus, in FIGS. 6 and 7, the second connecting member 25 for the tongues 23 is L-shaped, and accordingly has a transversely oriented portion on which the tongues 23 are fixed, together with an axially oriented portion constituting a skirt and having transverse lugs 53 at its outer periphery.

Each of the lugs 53 is engaged in a complementary notch 45 which is formed, in this example, in the free end of the flange 6. The notches 45 and the lugs 53 are overlaid by the flange 7. Similarly, the first member 24, which is flat in this case, has at its outer periphery lugs 44, each of which is engaged in a complementary notch 46 formed in the free end of the skirt 27. Two lugs 53, 44 are provided for each of the respective members 25, 24. This number does of course depend on the application. Using cold or hot working of the lateral edges of the notches 45, 46, the metal of the flange 6 and skirt 27 respectively is caused to flow so as to immobilise the lugs 43, 44 axially between the bases of the notches 45, 46 and the material reflowed during plastic flow of the side edges of the notches 45, 46. Thus, the members 25, 24 are seamed, in this case on the flange 6 and on the piston 4.

In another version, the flange 6 can partially surround the flange 7 so that the notches 45 can be formed in the flange 7. In a further version, the lugs 53, 54 are secured by welding or adhesive bonding on one of the flanges 6, 7 and on the piston 4.

In yet another version, the skirt of the member 25 is secured on the flange 6 by welding, for example by laser type transparency welding.

The first member 24 can be welded directly on the piston 4, and this component then comprises a first portion for fastening the appropriate end of a set of tongues, and a second portion which is axially offset for fastening the first member 24.

The piston 4 can also have at its outer periphery a transverse return projecting towards the axis X–X' and enabling the first member 25 to be secured, for example using pop rivets.

In FIGS. 1 to 6 a friction means 60 acts between a transverse surface formed in the radial plate 15 of the hub 14 and the piston 4, which is coupled releasably to the transverse wall by means of the second surface 2, lying in facing relationship with the first surface 1 as described above.

The friction means 60 prevents any direct contact occurring between the piston 4 and the transverse surface of the hub 14, and limits axial displacement of the piston 4, thereby preventing the latter from coming into contact with the turbine wheel 12. This friction means 60 comprises at least one friction element, for example having a low coefficient of friction. This friction element is preferably of synthetic material such as plastics material, which is preferably reinforced with fibres and/or beads such as glass fibres and/or beads.

In accordance with the invention, the piston 4 is so configured as to carry the friction means 60, and the hub 14 has an axially oriented annular portion directed towards the transverse wall 3 and surrounded by the piston 4, which is movable axially with respect to the said portion.

With this arrangement, the radial plate 15 of the hub 14 does not need to be given any additional machining operation, since the friction means 60 is carried by the piston 4. Another result is that the mechanical strength of the radial plate 15 is preserved, and in addition the solution is simple and inexpensive because the piston 4, which is preferably of metal, is a component that is easy to shape.

All of this goes well with the damper 28, because the piston 4 is fitted axially between the damper and the assembly consisting of the turbine wheel 12 and hub 14, coming as close as possible to the said assembly and in particular to the plate 15. In addition, the piston 4 is coupled in rotation to the outer periphery of one of the two casing elements 30, which enables a radial clearance to be formed between the flange 22 and the surface 20, so that risks of jamming of the piston 4 are minimised.

The piston 4 co-operates through its flange 22 solely with the seal 21 which is fixed axially to the hub 14, so that the friction means 60 have a good surface contact with the plate 15, since, because of the tongues 23 and seal 21, the piston 4 is able to be displaced, in particular axially and circumferentially, so that the contact surface between the friction means 60 and radial plate 15 are always maximised. Moreover, a higher torque is transmitted because of the location of the tongues 23 at the outer periphery of the casing 30, so that the liners 33 can have a large outside diameter.

In this example, either the friction means 60 or the piston 4 has at least one projecting element which is engaged in a complementary hole in the other one of these elements, i.e. the piston or friction means.

This method of coupling in mating cooperation is simple and inexpensive to achieve, and enables the friction means 60 to be properly centred while giving coupling in rotation.

The hole is preferably blind so that sealing of the chamber 17 is preserved. The blind hole is preferably formed by press-forming, or by drilling without drilling through, or by extrusion, and accordingly, in FIGS. 1 to 6, the friction means 60 consists of a ring which is adapted to come into contact with a transverse surface of the hub 14 formed in the radial plate 15, radially inside the fastening rivets 59. This surface faces towards the wall 3. The ring 60 has a plurality of bosses 61, each of which is engaged, with axial and radial clearance in this case, in a blind hole 62 formed by extruding the metal of the piston locally towards the wall 3.

The bosses 61 and holes 62 are cylindrical, being of circular cross section here but of square cross section or in any other form in other versions. The contact surface between the radial plate 15 and ring 60 is a maximum because of the axial and radial clearance in the fitting of the bosses 61 in the holes 62.

The structures can be reversed, see FIGS. 8 to 10, so that the blind hole 66 is formed in the friction ring 60 while the boss 166 is formed in the piston 4 by extrusion and plastic flow of material towards the plate 15. In another version, the boss 166 can be open, and can for example be in the form of a chimney. Preferably in that case, the friction ring 60 is force-fitted on the bosses 166 so as to preserve the seal of the piston 4.

Figure 5:
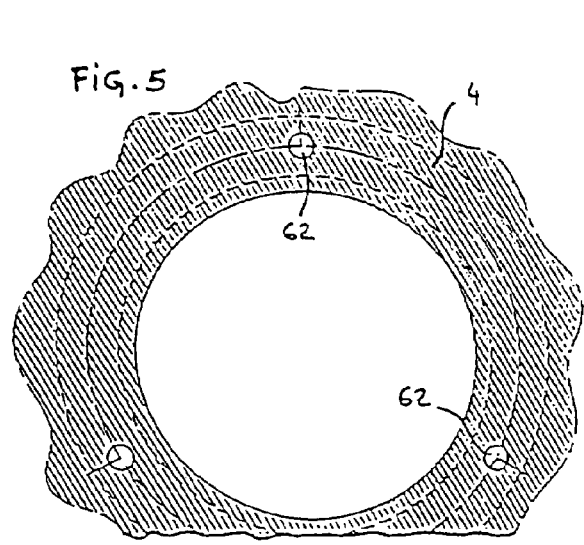
FIG. 5 is a scrap view in cross section on the line 5—5 in FIG. 4, without the hub and without the friction means.
Figure 4:
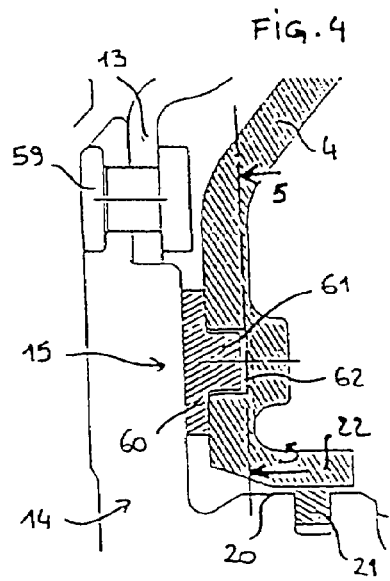
FIG. 4 is a view on an enlarged scale, from the lower part of FIG. 1, showing the friction means according to the invention.

The number of the holes depends on the application, and accordingly in FIGS. 1, 4 and 5, there are three holes 62 and three bosses 61, spaced apart at regular intervals on the circumference of the friction ring 60, while in FIGS. 8 to 10 there are two bosses 166 and two holes 66, diametrically opposed to each other. In that case, the holes 66 and bosses 166 are oblong.

The form and number of the holes and bosses respectively can of course be combined, and preferably there are at least two of the latter.

In another version, the bosses can penetrate into the holes with radial fitting clearance or without any clearance, that is to say force-fitted having regard to the fact that the piston may have rotational movement or angular displacement as described above.

As a result, the friction means 60 may consist of a ring divided into a plurality of annular sectors, engaged with the piston 4 preferably by at least two bosses and two holes.

In FIGS. 1 to 10 the friction means 60 has a maximum surface area of contact with the transverse surface of the hub 14 and piston 4, the said piston 4 being fully sealed.

In another version which is shown in FIGS. 11 to 13, sealing of the piston 4 can be preserved, with each of the bosses 166 penetrating into a through hole 164 formed in the friction ring 60, and the latter may be of divided form so that the friction surface is slightly reduced.

Figure 14:
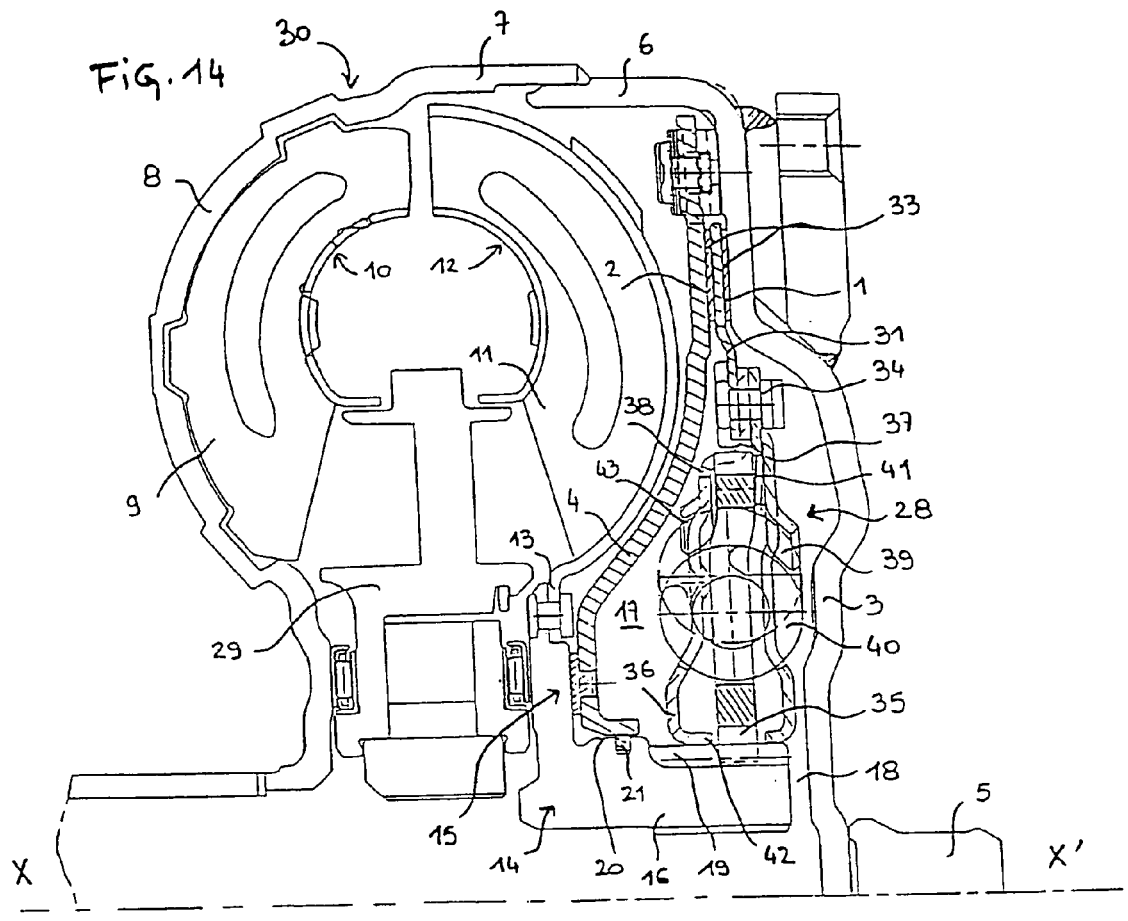
Figure 15:
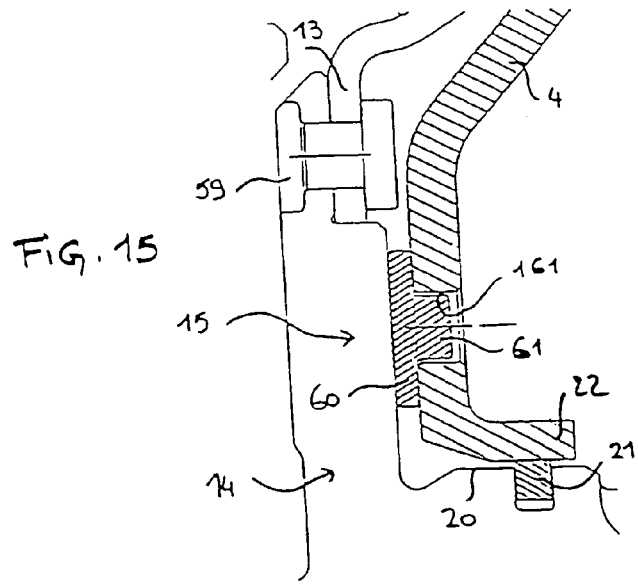

The through hole 164 can of course be formed in the piston 4, as can be seen in FIGS. 14 and 15, in which each of the bosses 61 penetrates into a through hole 161 in the piston 4.

Figure 16:
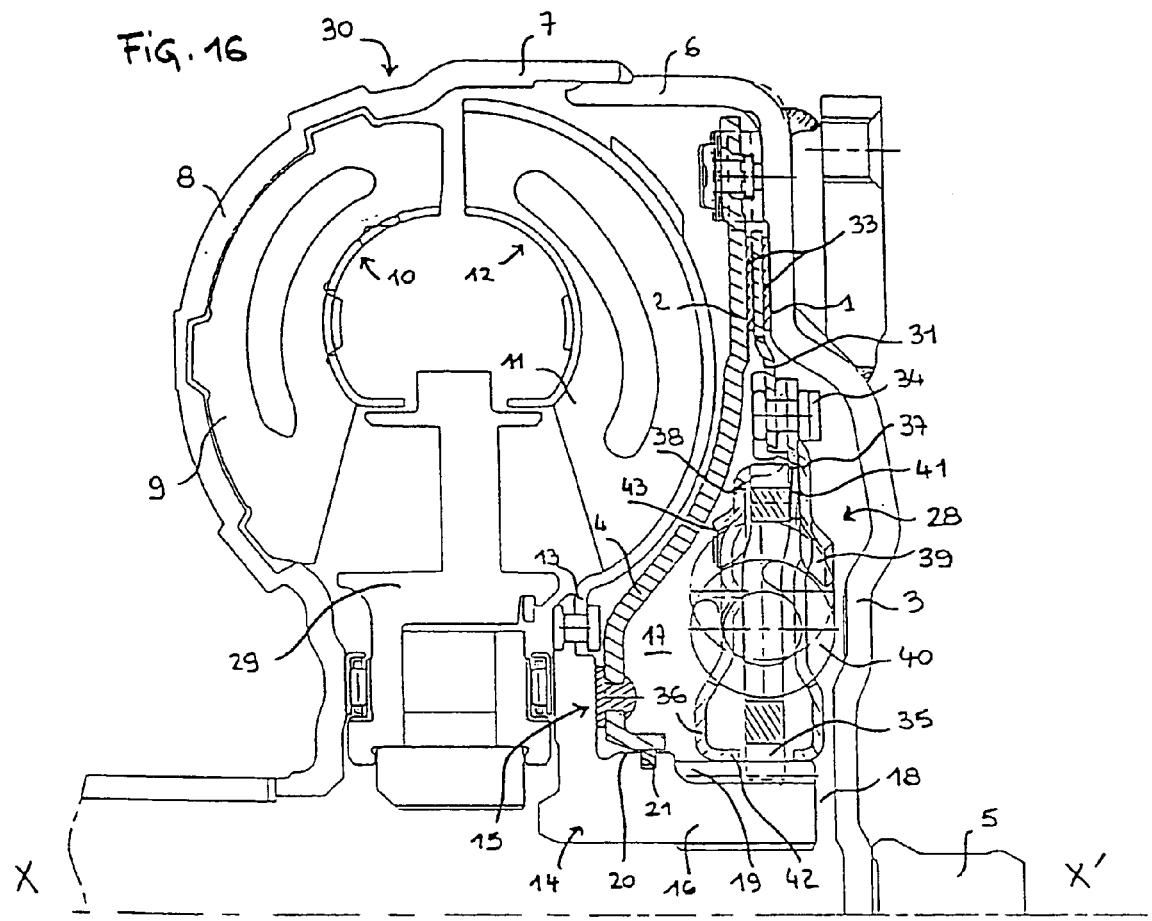
Figure 17:
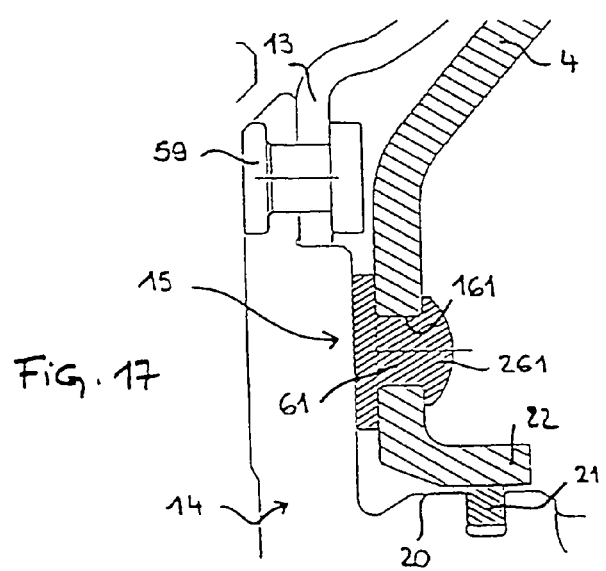

As explained above, the friction means 60 comprise at least one friction element such as the ring visible in FIG. 4, and this element is preferably made of plastics material. Thus in the embodiments in FIGS. 16 and 17, the bosses 61 are extended so as to traverse the holes 161, the free ends of the bosses 61 being hot worked to form a rivet head 261. In this way the friction means 60 becomes riveted on the piston 4, whereby to ensure sealing.

In a further version, the piston 4 carries at least one rivet for fastening the friction means 60, and this rivet is integral with the piston 4. Thus, in FIGS. 18 and 19, the projecting element 166 is extended so as to extend through an aperture 266 in the friction ring 60 and to be deformed so as to form a rivet head 366 lodged within a hollow housing 466, the outer diameter of which is greater than the diameter of the aperture 266, so that a shoulder 566 is formed at the change of diameter, the head 366 being in contact with the said shoulder 566.

Figure 20:
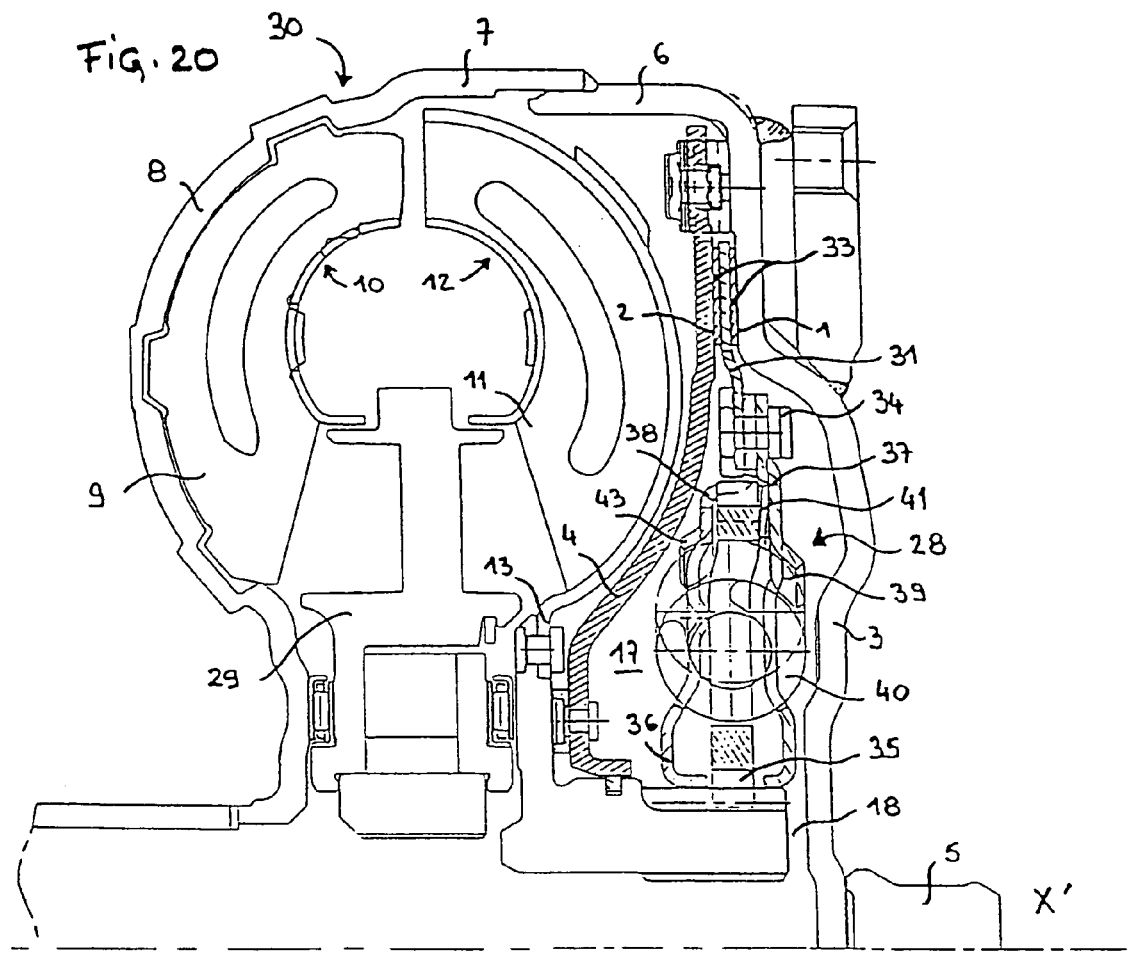
Figure 21:
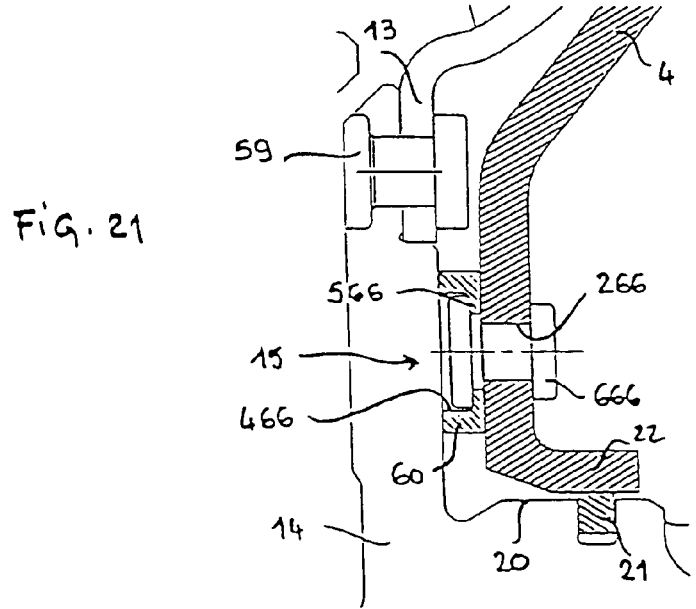

In a further version which is shown in FIGS. 20 and 21, the rivet 666 is mounted on the piston 4. This rivet 666 passes through the aperture 266 and its head is deformed into contact with the shoulder 566 of the housing 466, so as to achieve the riveting operation. During the riveting operation the rivet shank expands radially so as to provide the seal between the edges of the aperture 266 and the piston 4.

The rivet does of course not necessarily extend through an aperture in the friction means 60. Thus, in FIGS. 22 to 24 the boss 166 is deformed into contact with a shoulder 766 defined by a rebate 866 formed in the friction ring 60 at its outer periphery, the bosses 166 thereby centre the ring 60, and the head 966 of the rivet is engaged in a rebate 866 of the friction means 60, preferably after cold working, so that the said friction means 60 is immobilised axially and/or in rotation between the head 966 of the rivet on the one hand and the piston 4 on the other.

As will have been clearly understood, it is preferable that the projecting extends directly from the piston 4, this projection being either directed towards the wall 3 so as to define the blind hole 62 or else directed in the opposite direction as can be seen in FIGS. 22 to 24.

Figure 25:
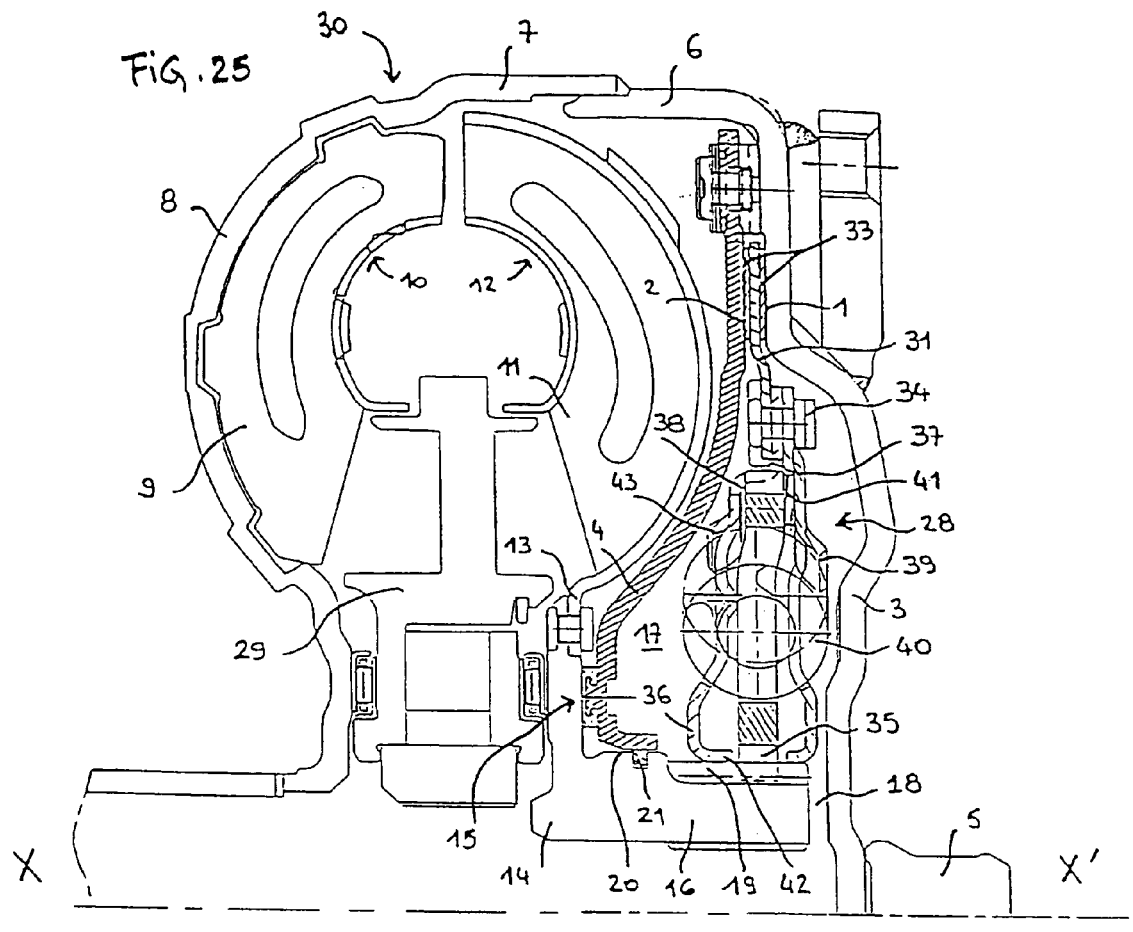
Figure 26:
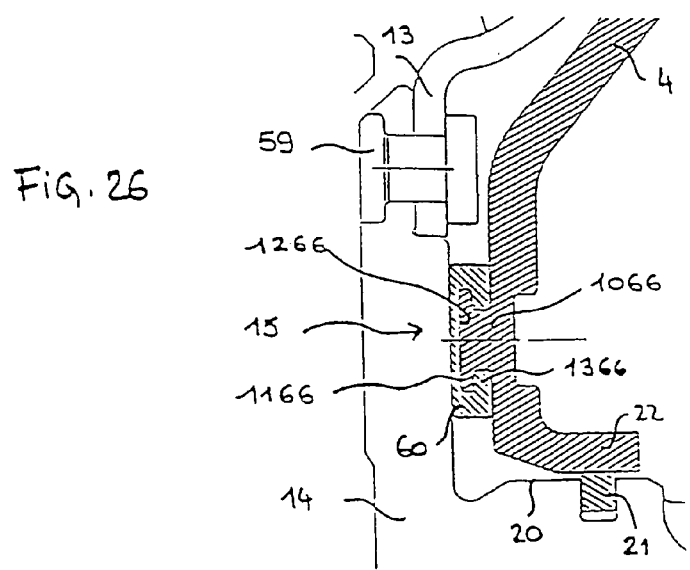
Figure 27:
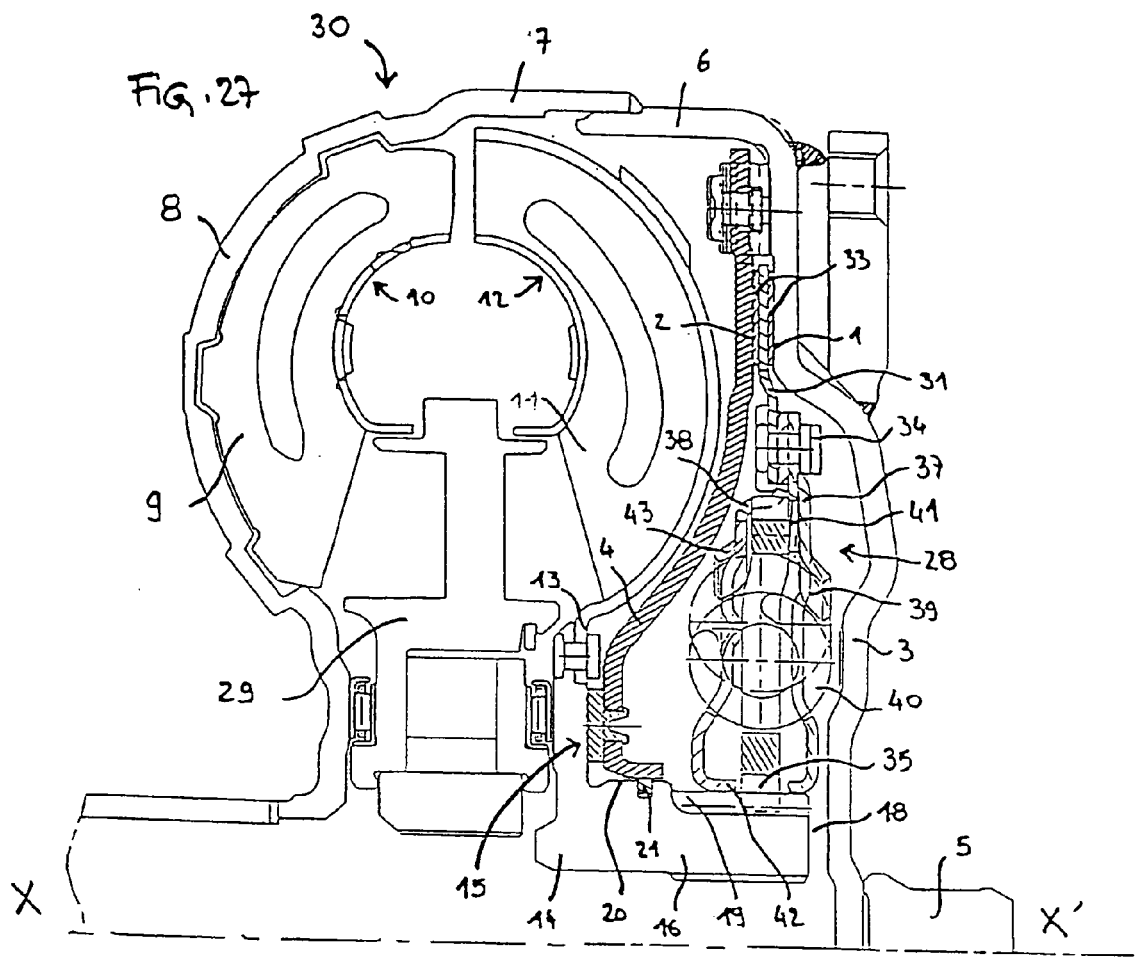

Accordingly, connections can be made by riveting, but they can also be made by in situ moulding or by snap-fitting. In FIGS. 25 and 26, the projecting portion 1066 of the piston 4 has a terminal collar portion 1166 of enlarged diameter, so that the friction means 60 can be formed by moulding over the projecting portion 1066 of the piston 4. In this case, the material of the friction means fills the space between the piston 4 and the collar portion 1166. The collar portion 1166 is thus encapsulated in the friction means 60. In another version, the friction means 60 can be snap-fitted on the projecting portion 1066, the collar portion 1166 of which constitutes a bead.

Thus the projecting portion 1066 is snap-fitted in a hole 1266 in the friction means 60, of castellated contour for example. As is best seen in FIG. 26, the friction means 60 includes at least one lip 1366 engaged in a groove of a projecting portion 1066 of the piston 4, this groove being delimited by the piston 4 and the bead 1166. In another version, the friction means 60 has at least one resilient lug engaged in the hole 161 in the piston 4 and provided with claws at its free end.

Figure 28:
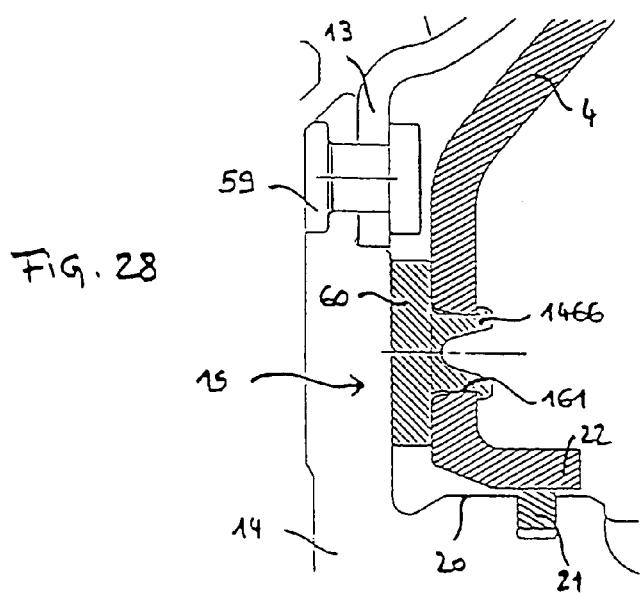

Thus in FIG. 28, the ring 60 has a plurality of lugs 1466 with claws, extending through the hole 161, and this hole is preferably flared towards the radial plate 15 so that the lugs 1466 are able to be retracted during their forcible engagement in the hole 161, and to be then deployed towards the outside once the claws of the lugs 1466 have come out on the other side. These claws come into engagement with the face of the piston that faces towards the wall 3.

Figure 29:
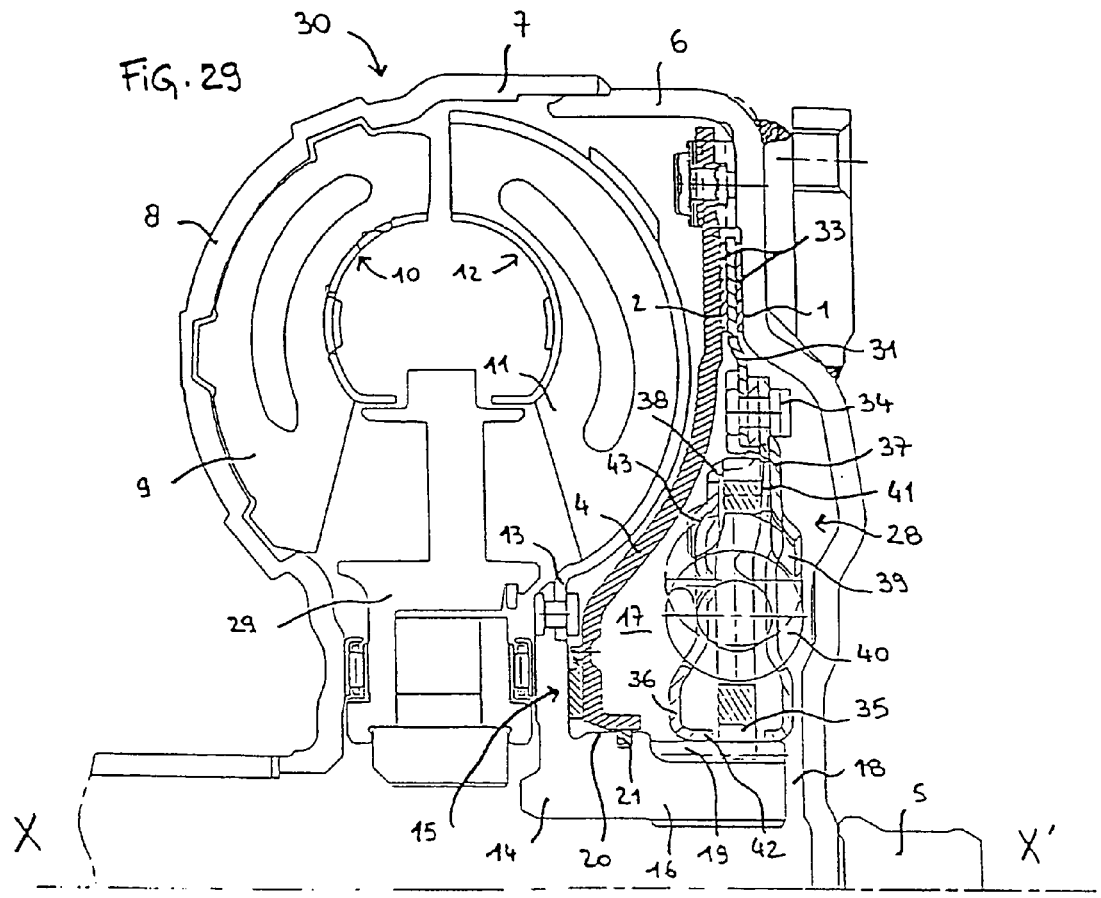
Figure 30:
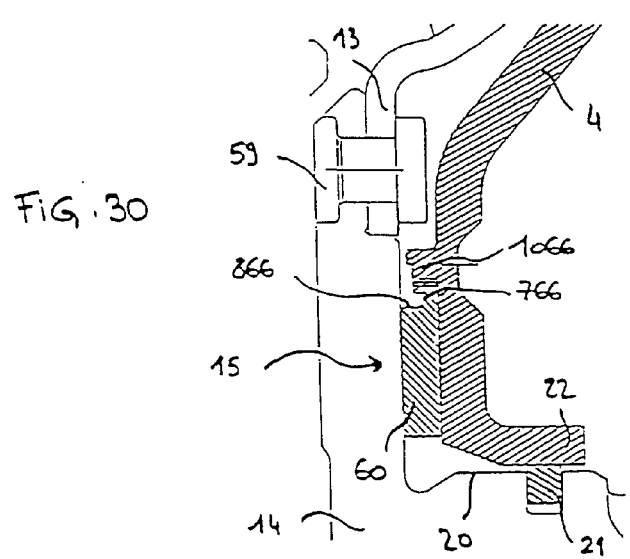

Snap-fitting means are thus interposed between the piston 4 and the friction means 60. Seaming means can of course be interposed between the piston 4 and the friction means 60. Thus in FIGS. 29 and 30, the friction ring 60 has a form identical with that of FIGS. 22 to 24, and the projecting portion 1066 has ridges which are designed to cut grooves in the outer periphery of the ring 60.

Thus the ring is forcibly engaged on the projecting portion so that the ring is coupled in rotation to the said projecting portion, which is harder than it is itself, with grooves being formed in the outer periphery of the ring 60. The material at the end of the projecting portion can then be upset into contact with the shoulder 766. The piston 4 has at least one projecting portion which is deformed by plastic flow of the material into contact with a surface (the shoulder 766) of the friction means 60 facing away from the piston. The surface 766 is defined by a reduction in thickness. This reduction in thickness can of course be formed, as visible in FIGS. 31 and 32, at the inner periphery of the ring 60, the rebate being then formed at the inner periphery of the ring 60. The projecting portion 2066 then consists of an axially oriented annular flange on the inner periphery of the piston 4. This projecting portion is splined and deformed into contact with the shoulder of the ring 60 facing towards the plate 15. The flange may serve only for the purpose of centring the ring 60 as visible in FIGS. 33 and 34, the ring 60 then having no reduction in thickness.

In a further version, the flange can have an external thread, while the friction ring has an internal thread, thereby giving a screw and nut type fastening.

The piston 4 may have local recesses 400, extending radially as can be seen in FIGS. 35 to 37, the recesses 400 being formed in the flange 2066 and overlapping radially with respect to the ring 60, thereby enabling oil to flow between the inner and outer peripheries of the ring 60. This oil flow creates an oil film between the piston 4 and the friction ring 60, so that wear is diminished between these two elements, with the friction ring 60 preferably rubbing on the plate 15. The movement of the piston 4 towards the plate 15 is easy and is not hindered by the presence of oil between the piston 4 and plate 15. Such an arrangement is also applicable to the other embodiments. The face of the ring 60 facing towards the plate 15 may be given grooves to permit such an oil flow. It is of course possible to provide grooves on both faces of the friction ring 60. Where the friction ring 60 is of divided form, oil flow automatically results between the outer and inner peripheries of the friction means, and therefore so also does the creation of an oil film between the friction means and the transverse surface of the hub.

Thus the friction means has at least one passage between its inner and outer peripheries to enable a fluid to flow. In one embodiment, the friction means consists of a ring having on at least one of its faces a passage such as a groove extending from its inner periphery to its outer periphery.

Figure 38:
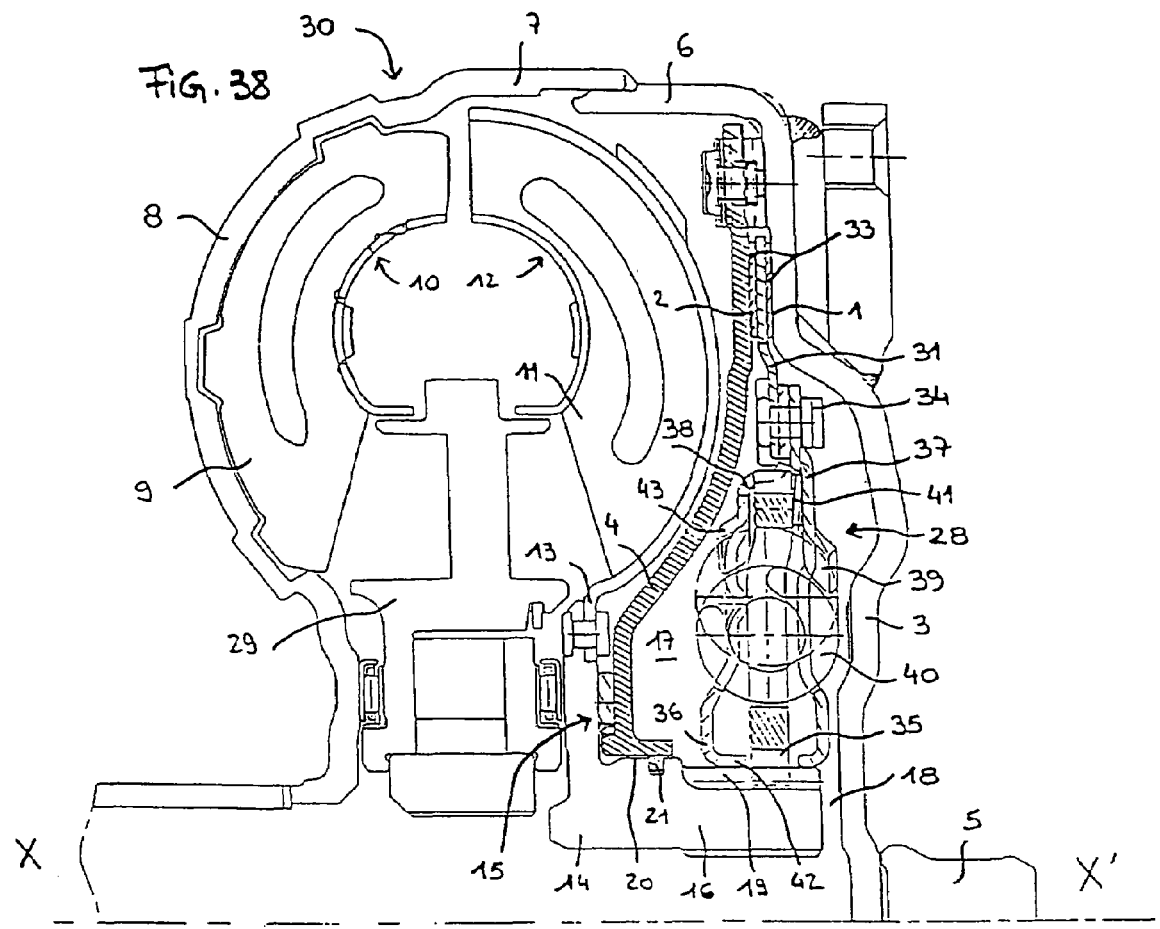
Figure 40:
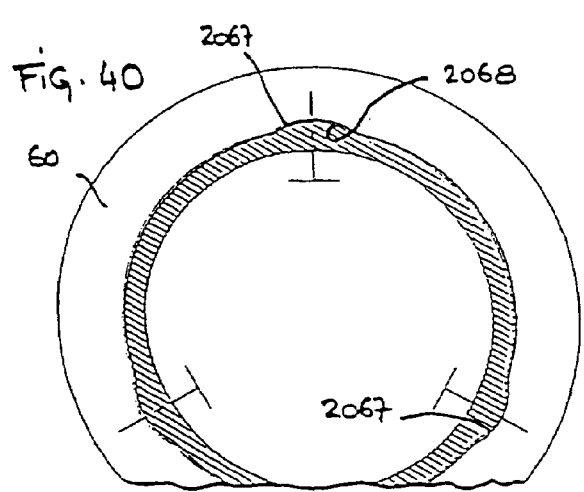
FIG. 40 is a view in cross section taken on the line 40—40 in FIG. 39.
Figure 39:
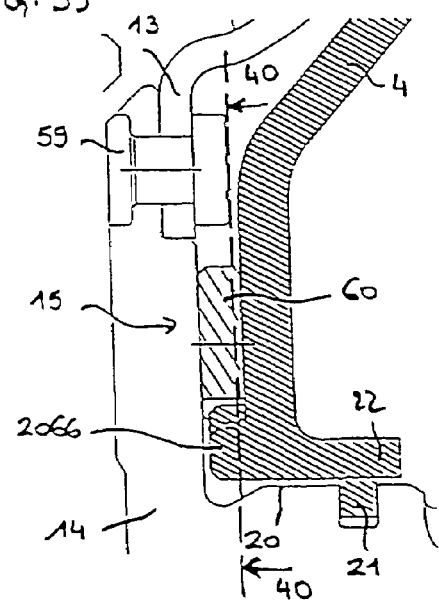

In FIGS. 38 to 40, the flange 2066 may be given projecting elements 2067, each of which is engaged in a complementary notch 2068 formed in the inner periphery of the ring 60, which is thereby coupled in rotation to the piston 4 in mating cooperation, being carried by the latter as can be seen in FIGS. 33 to 37.

All combinations or modifications are of course possible.

In FIGS. 41 and 42, the bead of the projecting portion 1066 is not necessarily in the form of a collar portion, but may be formed in a rounded profile as visible at 1067 in FIG. 42, and the internal bore 1068 of the passage hole formed in the ring 60 for receiving the projecting portion 1066 can have a central point such that fitting of the ring 60 is achieved by applying a pressure on the ring 60, leading to an eversion, that is to say one particular form of snap-fitting.

The ring 60 may be chamfered at its outer periphery so that it can be secured by riveting to the piston 4 as can be seen in FIGS. 43 and 44. The embodiment in FIGS. 43 and 44 also enables snap-fitting to be obtained because the outer periphery of the ring 60 comprises a rounded portion joined to the chamfer which is adapted for cooperation with the bead of the projecting portion 1066. Thus the point, after being formed into a button, is engaged in a groove bounded by the piston 4 and the bead 1067 of the piston.

The friction means 60 may be carried by the hub 14, and this friction means 60 may be coupled in rotation to the radial plate 15 by means of projecting elements engaged in blind holes in the plate 15, though preferably, and as in the foregoing Figures, so as to avoid machining of the hub and therefore to simplify the elements of the apparatus while reducing cost without adversely affecting performance, the friction means 60 will be carried by at least one of the rivets 59 by which the turbine wheel 12 is fastened to the plate 15. More precisely, and as described above, the rivet 59 serves to secure the ring 13, which has at its inner periphery the turbine wheel 12, to the plate 15, which has a rebate for this purpose as can best be seen in FIGS. 45 to 47. To this end, the rivet 59 has a projecting head which has a thickened portion 159 for fastening the friction means 60. In FIGS. 45 to 47 the thickened portion 159 is also of constant width.

In the embodiment in FIGS. 45 to 47, the friction means 60 is moulded on the thickened portion 159, given that in this embodiment, all of the rivets, which are spaced apart circumferentially at regular intervals, have such a thickened portion 159.

Figure 48:
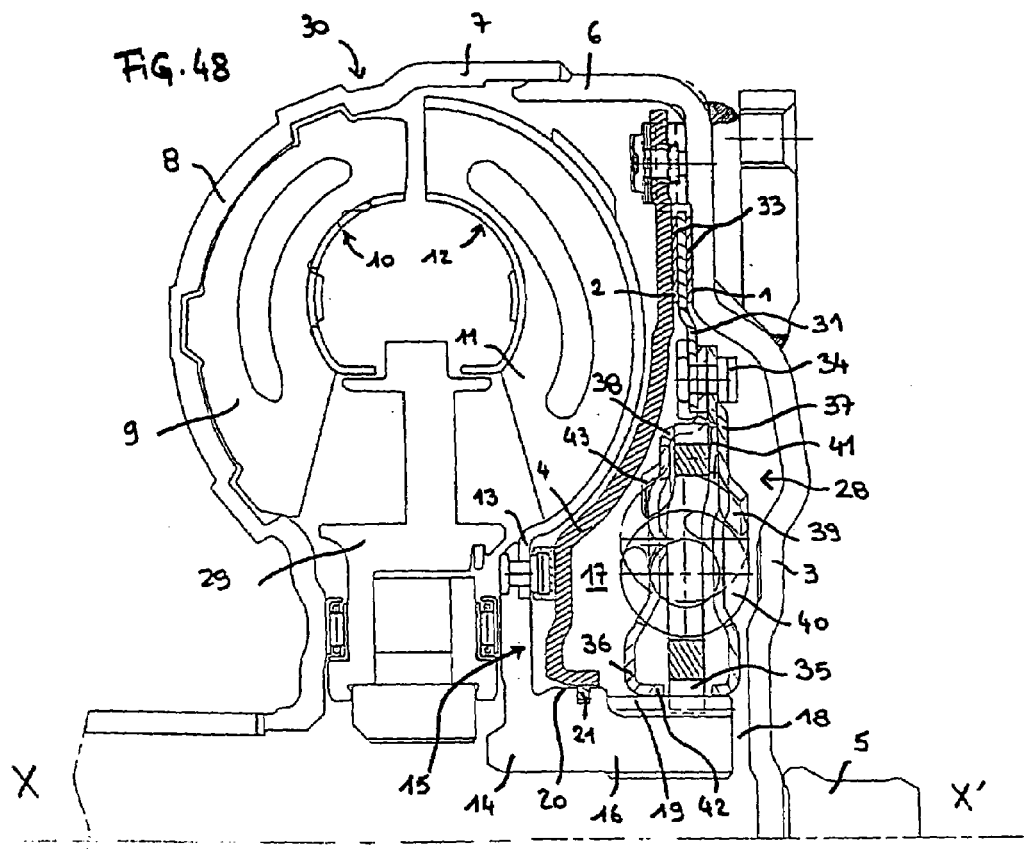
Figure 49:
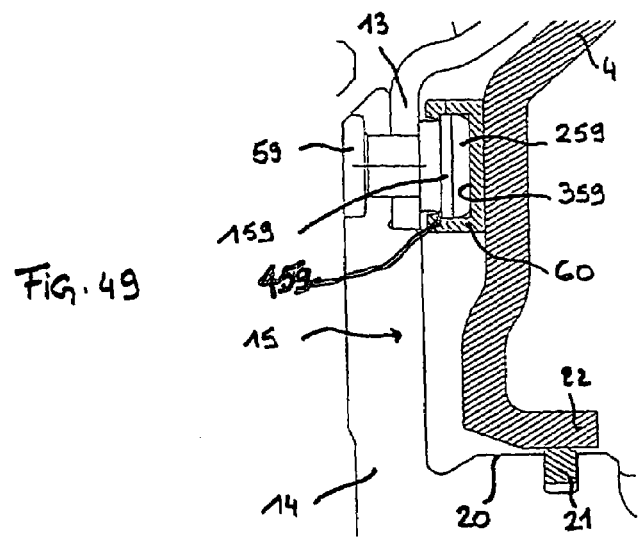

In another version, some of the rivets 59 do not have such a head. In a further version, the thickened portion 159 is narrower and is joined to the free end through a portion 259 of penetrating form. In FIGS. 48 and 49, the portion 259 is of generally chamfered form. The friction means is accordingly snap-fitted on the thickened portion of the head 159, 259. The friction means 60 includes for this purpose a blind cavity 359 which is open towards the plate 15 of the hub 14 so as to accommodate the thickened portion. The cavity 359 is bounded by L-shaped lugs 459, these lugs 459 being elastically deformable transversely and arranged to come into contact with the face of the thickened portion 159 that faces away from the piston 4. The portion 159 thus makes contact with the base of the cavity 359.

In FIGS. 45 to 49, the friction means 60 comprises a plurality of elements fixed to the rivet heads, or else a single friction means in the form of a ring, or again, at least one annular sector fixed to at least one rivet head.

In FIGS. 50 to 52, the thickened portion 159 may be of constant width, and the elements 160 in the form of annular sectors have an oblong circumferential cavity 360 in which the thickened portions 159 are engaged. The cavity 360 is open axially towards the ring 13 and therefore towards the plate 15, and its aperture is bounded by a lip 460 which is arranged to cooperate with the face of the thickened portion facing towards the ring 13. The cavity 360 is preferably open towards the piston 4 so as to enable the rivets 59 to be passed through the said cavity 360 and secured. The corresponding aperture 362 defining a shoulder 361 for engagement of the thickened portion is thus arranged to be trapped between the shoulder 461 and the lip 460.

The latter may of course comprise one or more elements in the form of annular sectors 160 as can be seen in FIGS. 50 to 52. The rivets 59 are introduced into the holes 363, and then the heads having the thickened portions 159, which are guided into the cavity 360. The rivets are thus positioned in the friction means 60, and the rivets can with advantage be held in position by clipping before riveting of the assembly thus constituted, namely the friction means 60 and rivets 59.

In another version, the friction means 60 may be mounted on a bayonet type fitting, the rivet heads being positioned in holes in the friction means 60, and the whole is then positioned by rotation or relative circular displacement of one with respect to the other, that is to say of the rivets 59 with respect to the friction means 60. The assembly could of course be held in position by clips. A passage 363 is formed in the lip, this passage having a dimension, the diameter in this case, which is sufficient to enable the thickened portion to penetrate, the ring 13 being then turned after the thickened portion has penetrated so that a bayonet type fitting is obtained. This type of bayonet fitting is applicable to the case where the piston carries the friction means 60, the rivets being then fixed to the piston, and the friction means may be divided into annular sectors.

In another version, in FIGS. 53 to 55, the head of the rivet 59 is engaged in an aperture 364 formed in the friction means, and in this case the aperture 364 is bounded by the adjacent ends of two successive sectors, these ends having a semicircular notch such that the aperture 364 is in the form of a cylindrical hole whereby each sector 160 is fitted over two rivet heads. The same is true in FIGS. 56 to 58, in which the apertures 464 are wider at the outer periphery than at their inner periphery, so that each sector could be force-fitted over at least one rivet head, or preferably two heads as in the preceding Figures, and these heads can be successive heads. The ends of the sectors 160 may be of any form whatever which enables them to be fitted over two rivet heads, for example each end of each element 60 may have a V-shaped recess, the dimension of which will be a function of the dimension of the rivet head. The rivet head must be large enough to prevent the friction means 60 from escaping when the piston 4 is displaced away from the friction means. The ring 13 may be fixed on the other side of the plate 15, and it is then the foot of the rivet that extends between the piston 4 and the plate 15, and this foot may be extended so that it will engage in an aperture in the friction means, for example of the same type as that in FIGS. 53 to 58.

It will be clear that the tongues in FIGS. 8 to 58 may be replaced by those of FIGS. 6 and 7. The tongues 23 then lie radially outside the second surface 2, or facing the latter as in FIGS. 6 and 7.

The friction means 60 does not necessarily cooperate with the radial plate 15, so that the friction means 60 may cooperate with a transverse surface formed in the axial part of the hub 14, for example at a change in diameter of the latter, so that the transverse surface is not necessarily part of the plate 15. The flange 22 may slide along the surface 20 with a fitting clearance, and in that case the friction means 60 may included elastic elements so that it can always remain in contact with the associated transverse surface of the hub 14, for example in the embodiment in FIG. 4, in which each boss can be surrounded by a sleeve of a material such as an elastomer. The sleeve is then interposed between the perimeter of the hole 62 and the projecting portion 61, which enables the ring 60 to move with respect to the piston 4.

In all of the drawings a groove is provided in the region of the root of radial plate 15 on the axial portion 16 of the hub 14. This groove reduces mechanical stresses and avoids any interference with the piston 4, especially where the latter includes a flange 2066 as shown in FIGS. 34, 37 and 40. In another version, a relief may be provided in the region of the root of the axial portion of the hub 14 in the radial plate 15, the said relief being preferably combined with a chamfer on the piston and/or the friction means, with a view to preventing any interference.

The seal 21 may consist of an elastically deformable segment, and it is in order to facilitate fitting of the piston 4 and seal 21 that the piston 4 is chamfered in the region of its flange 22, as shown in all of the drawings.

In FIGS. 48 and 49, and 50 to 52, the friction means 60 may be out of engagement on the rivet head, but it is preferably in direct engagement on the turbine hub or turbine wheel, so that the friction means 60 is mounted with an axial clearance with respect to the thickened portion 159, and manufacturing tolerances are thus reduced.

What is claimed is:

1. Hydrokinetic coupling apparatus, comprising:
   a casing (30) having a transverse wall (3) coupled in rotation to a driving shaft;
   a turbine wheel (12) mounted within the casing (30) and fixed to a hub (14) which is adapted to be coupled in rotation to a driven shaft;
   a fixed first surface (1) on the transverse wall (3) of the casing (30);
   a lock-up clutch interposed between said turbine wheel (12) and said transverse wall (3) and comprising a piston (4) carrying a second surface (2), which lies facing the first surface (1) for coupling the second surface (2) releasably to the transverse wall; and
   a friction means (60) acting between a face of the piston (4) opposite the second surface (2) and a radial plate (15) of the hub (14) situated in facing relationship thereto,
   wherein the piston (4) is mounted to rotate relative to the hub (14) and is so configured as to carry the friction means (60).

2. Hydrokinetic coupling apparatus according to claim 1, wherein one of the friction means (60) and the piston (4) has at least one projecting element (61, 166, 1066, 1466, 2066, 2067) engaged in a complementary hole (62, 66, 161, 164, 266, 1266, 2068) of the other one of the piston (4) and friction means (60).

3. Hydrokinetic coupling apparatus according to claim 2, wherein the hole (62, 66, 161, 164, 266, 1266, 2068) is a blind hole.

4. Hydrokinetic coupling apparatus according to claim 3, wherein the blind hole (62) is one of press-formed, formed by drilling partway through and by extrusion.

5. Hydrokinetic coupling apparatus according to claim 2, wherein the hole (161) is a through hole.

6. Hydrokinetic coupling apparatus according to claim 5, wherein the hole (66) has an oblong circumferential form.

7. Hydrokinetic coupling apparatus according to claim 5, wherein the hole (164, 161) is cylindrical.

8. Hydrokinetic coupling apparatus according to claim 2, wherein rivet means (366, 666, 966, 1166) are interposed between the friction means (60) and the piston (4).

9. Hydrokinetic coupling apparatus according to claim 8, wherein the piston (4) carries at least one rivet (966, 1266) of the rivet means for fastening the friction means (60).

10. Hydrokinetic coupling apparatus according to claim 9, wherein the at least one rivet (666) is carried by the piston (4).

11. Hydrokinetic coupling apparatus according to claim 9, wherein the at least one rivet (966) is integral with the piston (4).

12. Hydrokinetic coupling apparatus according to claim 8, wherein a head of the rivet (366) is engaged in a housing in the friction means (60).

13. Hydrokinetic coupling apparatus according to claim 7, wherein the friction means (60) is of synthetic material and comprises at least one body (261) engaged in the hole in the piston (4) and sealingly closing off said hole (161) after hot working.

14. Hydrokinetic coupling apparatus according to claim 11, wherein a rivet head (966) is engaged in a rebate (866) in the friction means (60) after deformation.

15. Hydrokinetic coupling apparatus according to claim 1, wherein the friction means (60) is formed by moulding over a projecting portion (1066, 1166) of the piston (4).

16. Hydrokinetic coupling apparatus according to claim 2, wherein snap-fitting means (166, 1466, 161) are interposed between the piston (4) and the friction means (60).

17. Hydrokinetic coupling apparatus according to claim 16, wherein the piston (4) has a projecting portion (1066) with a bead (1166) engaged in a hole of the friction means (60).

18. Hydrokinetic coupling apparatus according to claim 17, wherein the friction means (60) includes a point engaged in a groove of a projecting portion (1066), having a terminal bead (1067), of the piston (4), and wherein the groove is delimited by the piston (4) and the bead (1067).

19. Hydrokinetic coupling apparatus according to claim 16, wherein at least one resilient lug (1466) having claws is engaged in said hole in the piston (4).

20. Hydrokinetic coupling apparatus according to claim 2, wherein a seaming means (1066, 766) is interposed between the piston (4) and the friction means (60).

21. Hydrokinetic coupling apparatus according to claim 18, wherein the piston (4) has a projecting portion (1066, 2066) which is deformed by plastic flow of material into contact with a surface of the friction means (60) facing away from the piston (4).

22. Hydrokinetic coupling apparatus according to claim 21, wherein the surface (766) is defined by a reduction in thickness.

23. Hydrokinetic coupling apparatus according to claim 22, wherein the friction means (60) consists of a ring.

24. Hydrokinetic coupling apparatus according to claim 23, wherein the friction means (60) consists of a plurality of annular sectors (160).

25. Hydrokinetic coupling apparatus according to claim 23, wherein the hub (14) has a radial plate (15) fixed to the turbine wheel (12), and in that the friction means (60) acts between the radial plate (15) and the piston (4).

26. Hydrokinetic coupling apparatus, comprising
   a casing (30) having a transverse wall (3) coupled in rotation to a driving shaft;
   a turbine wheel (12) mounted within the casing (30) and fixed to a hub (14) which is adapted to be coupled in rotation to a driven shaft;
   a fixed first surface (1) on the transverse wall (3) of the casing (30); and
   a lock-up clutch interposed between said turbine wheel (12) and said transverse wall (3) and comprising a piston (4) carrying a second surface (2), which lies facing the first surface (1) for coupling the second surface (2) releasably to the transverse wall (3), the piston (4) being mounted to rotate relative to the hub (14);
   wherein the turbine wheel (12) includes an annular ring (13) which is fixed to the hub (14) by means of at least one rivet (59); and
   wherein a friction means (60) acts between the hub (14) and the piston (4), and wherein the friction means (60) is carried by said at least one rivet (59).

27. Hydrokinetic coupling apparatus according to claim 26, wherein at least one rivet (59) has a head projecting towards the piston (4) and having a thickened portion (159, 259) for fastening the friction means (60).

28. Hydrokinetic coupling apparatus according to claim 27, wherein the thickened portion (159, 259) is at the free end of the head.

29. Hydrokinetic coupling apparatus according to claim 28, wherein the thickened portion (159) is of constant width.

30. Hydrokinetic coupling apparatus according to claim 29, wherein the thickened portion (259) is joined to the free end of the head through a portion of penetrating form.

31. Hydrokinetic coupling apparatus according to claim 30, wherein the friction means (60) is moulded in place on the head.

32. Hydrokinetic coupling apparatus according to claim 31, wherein the friction means (60) is snap-fitted on the thickened portion (159, 259).

33. Hydrokinetic coupling apparatus according to claim 32, wherein the friction means (60) has a blind cavity (359) open towards the hub (14) for accommodating the thickened portion (159, 259).

34. Hydrokinetic coupling apparatus according to claim 33, wherein the cavity (359) is delimited by L-shaped lugs (459) which are elastically deformable transversely and which are adapted to come into engagement with the face of the thickened portion facing away from the piston (4).

35. Hydrokinetic coupling apparatus according to claim 30, wherein the friction means (60) is mounted on the thickened portion (159, 259) by a fitting whereby one member at least partially passes into another member.

36. Hydrokinetic coupling apparatus according to claim 30, wherein the friction means (60) has, firstly, a cavity (360) open axially away from the piston (4) and being of oblong form circumferentially, for receiving the thickened portion (159), and secondly, an axially oriented passage (363) open on the side of the piston (4), and in that the passage is so dimensioned as to enable the thickened portion to penetrate into the cavity before being riveted on the hub.

37. Hydrokinetic coupling apparatus according to claim 36, wherein the cavity (360) includes at least one hole (362) through which riveting is carried out.

38. Hydrokinetic coupling apparatus according to claim 37, wherein the piston (4) surrounds the axially oriented annular portion (16) of the hub (14) with a radial clearance.

39. Hydrokinetic coupling apparatus according to claim 38, wherein the piston (4) is coupled to the casing (30) by axially elastic tongues (23), and wherein the tongues (23) are radially outside the second surface (2).

40. Hydrokinetic coupling apparatus according to claim 39, wherein the friction means (60) has at least one passage (400) between its inner and outer peripheries to permit passage of a fluid.

41. Hydrokinetic coupling apparatus according to claim 40, wherein the friction means (60) consists of a ring having, in at least one of its faces, a passage extending from its inner periphery to its outer periphery.

42. Hydrokinetic coupling apparatus according to claim 41, wherein the piston (4) is coupled to the casing (30) by axially elastic tongues (23), and wherein the tongues (23) lie facing the second surface.

43. Hydrokinetic coupling apparatus according to claim 42, wherein the friction means (60) comprise a plurality of friction elements.

44. Hydrokinetic coupling apparatus according to claim 43, wherein the friction means (60) is mounted with an axial clearance with respect to the thickened portion (159), and wherein the friction means (60) is in direct engagement on one of the turbine hub and the turbine wheel (12).

* * * * *